(12) United States Patent
Max

(10) Patent No.: US 6,673,249 B2
(45) Date of Patent: Jan. 6, 2004

(54) EFFICIENCY WATER DESALINATION/ PURIFICATION

(75) Inventor: Michael D. Max, Washington, DC (US)

(73) Assignee: Marine Desalination Systems, L.L.C., Washington, DC (US)

(*) Notice: Subject to any disclaimer, the term of this patent is extended or adjusted under 35 U.S.C. 154(b) by 92 days.

(21) Appl. No.: 09/987,725

(22) Filed: Nov. 15, 2001

(65) Prior Publication Data

US 2002/0060192 A1 May 23, 2002

Related U.S. Application Data

(60) Provisional application No. 60/252,411, filed on Nov. 22, 2000, provisional application No. 60/255,066, filed on Dec. 14, 2000, and provisional application No. 60/264,326, filed on Jan. 29, 2001.

(51) Int. Cl.[7] ................................................. C02F 1/00
(52) U.S. Cl. ...................... 210/747; 210/750; 210/170; 210/188; 210/198.1; 62/532; 62/618; 62/632; 62/635; 203/10; 585/15
(58) Field of Search .................... 210/747, 750, 210/170, 188, 198.1; 62/532, 618, 632, 635; 203/10; 585/15

(56) References Cited

U.S. PATENT DOCUMENTS

| 135,001 A | 1/1873 | Meylert |
| 2,904,511 A | 9/1959 | Donath |
| 2,974,102 A | 3/1961 | Williams |

(List continued on next page.)

FOREIGN PATENT DOCUMENTS

| GB | 1 320 134 | 6/1973 |
| JP | 55055125 | 4/1980 |
| JP | 58109179 | 6/1983 |
| JP | 58-109179 | 6/1983 |

(List continued on next page.)

OTHER PUBLICATIONS

Russian Abstract Publication No. 2166348, May 10, 2001, Mel'nikov et al.

Rautenbach et al., Entwicklung und Optimierung eines Hydrat–Verfahrens zur Meerwasserentsalzung, Chemie–Ing.–Techn 45 jahrg. 1973/Nr. 5, pp. 259–254.

Seliber, Methane Cooled Desalination Method and Apparatus, USPTO, Defensive Publication T939,007—Published Oct. 7, 1975.

Japanese Abstract, Journal No.: G0941AAK ISSN No. 0453–0683, 1995, vol. 42, No. 7, Accession No.: 95A0492545, File Segment: JICST–E.

EPO—Patent Abstracts of Japan Publication No. 61136481, Publication date Jun. 24, 1986, Muneschichi, Concentration of Aqueous Solution English language abstract.

(List continued on next page.)

Primary Examiner—Betsey Morrison Hoey
(74) Attorney, Agent, or Firm—Pillsbury Winthrop LLP

(57) ABSTRACT

Various methods and apparatus for maximizing the efficiency of hydrate-based desalination or other water purification in open-water or partially open-water installations are disclosed. In one embodiment, water is accessed from depth where the ambient temperature is as cold as possible, which depth is other than the maximum depth of the hydrate fractionation column used in the process. The accessed water preferably is brought to reduced pressures so that gases other than hydrate-forming gases that are dissolved in the water to be treated are exsolved. Using pre-pressurized sources of hydrate-forming substances, including deep-sea natural gas deposits or supplies of liquified natural gas being transported by sea, are also disclosed. A multiple column, detachable column fractionation installation is disclosed, as is a hybrid installation having an underwater hydrate formation portion and a land-based dissociation and heat-exchange section.

38 Claims, 12 Drawing Sheets

U.S. PATENT DOCUMENTS

| | | |
|---|---|---|
| 3,027,320 A | 3/1962 | Buchanan |
| 3,119,771 A | 1/1964 | Cottle |
| 3,119,772 A | 1/1964 | Hess et al. |
| 3,126,334 A | 3/1964 | Harlow |
| 3,132,096 A | 5/1964 | Walton |
| 3,148,143 A | 9/1964 | Donath |
| 3,155,610 A | 11/1964 | Williams |
| 3,171,727 A | 3/1965 | Brown |
| 3,214,371 A | 10/1965 | Tuwiner |
| 3,217,505 A | 11/1965 | Tuwiner |
| 3,243,966 A | 4/1966 | Glew |
| 3,308,063 A | 3/1967 | Hess et al. |
| 3,350,299 A | 10/1967 | Hess et al. |
| 3,350,300 A | 10/1967 | Hess et al. |
| 3,371,035 A | 2/1968 | Jacobs |
| 3,675,436 A | 7/1972 | Ganiaris |
| 3,712,075 A | 1/1973 | Smith et al. |
| 3,813,892 A | 6/1974 | Johnson |
| 3,856,492 A | 12/1974 | Klass |
| 3,892,103 A | 7/1975 | Antonelli |
| 3,983,032 A | 9/1976 | Hess et al. |
| 3,992,170 A | 11/1976 | Karnofsky |
| 4,170,328 A | 10/1979 | Kirk et al. |
| 4,207,351 A | 6/1980 | Davies |
| 4,267,022 A | 5/1981 | Pitcher |
| 4,278,645 A | 7/1981 | Filss |
| 4,376,462 A | 3/1983 | Elliott et al. |
| 4,392,959 A | 7/1983 | Coillet |
| 4,424,858 A | 1/1984 | Elliott et al. |
| 4,643,832 A | 2/1987 | Iniotakis et al. |
| 4,652,375 A | 3/1987 | Heilweil et al. |
| 4,670,159 A | 6/1987 | Garrett et al. |
| 4,678,583 A | 7/1987 | Willson, III et al. |
| 4,686,833 A | 8/1987 | Hino et al. |
| 4,696,338 A | 9/1987 | Jensen et al. |
| 4,718,242 A | 1/1988 | Yamauchi et al. |
| 4,767,527 A | 8/1988 | Iniotakis et al. |
| 4,821,794 A | 4/1989 | Tsai et al. |
| 5,037,555 A | 8/1991 | Pasternak et al. |
| 5,055,178 A | 10/1991 | Sugier et al. |
| 5,076,934 A | 12/1991 | Fenton |
| 5,110,479 A | 5/1992 | Frommer et al. |
| 5,128,042 A | 7/1992 | Fenton |
| 5,159,971 A | 11/1992 | Li |
| 5,167,838 A | 12/1992 | Wilensky |
| 5,304,356 A | 4/1994 | Iijima et al. |
| 5,362,467 A | 11/1994 | Sakai et al. |
| 5,364,611 A | 11/1994 | Iijima et al. |
| 5,397,553 A | 3/1995 | Spencer et al. |
| 5,444,986 A | 8/1995 | Hino |
| 5,448,892 A | 9/1995 | Cheng |
| 5,473,904 A | 12/1995 | Guo et al. |
| 5,497,630 A | 3/1996 | Stein et al. |
| 5,512,176 A | 4/1996 | Blair |
| 5,553,456 A | 9/1996 | McCormack |
| 5,562,891 A | 10/1996 | Spencer et al. |
| 5,660,603 A | 8/1997 | Elliot et al. |
| 5,679,254 A | 10/1997 | Chakrabarti |
| 5,816,057 A | 10/1998 | Dickey et al. |
| 5,873,262 A | 2/1999 | Max et al. |
| 6,028,234 A | 2/2000 | Heinemann et al. |
| 6,089,022 A | 7/2000 | Zednik et al. |
| 6,106,595 A | 8/2000 | Spencer |
| 6,112,528 A | 9/2000 | Rigby |
| 6,158,239 A | 12/2000 | Max et al. |
| 6,180,843 B1 | 1/2001 | Heinemann et al. |
| 6,245,955 B1 | 6/2001 | Smith |
| 6,296,060 B1 | 10/2001 | McCaslin |

FOREIGN PATENT DOCUMENTS

| | | |
|---|---|---|
| JP | 59-29078 | 2/1984 |
| JP | 59029078 | 2/1984 |
| JP | 61025682 | 2/1986 |
| JP | 11319805 | 11/1999 |
| JP | 2000202444 | 7/2000 |
| SU | 997715 | 2/1983 |
| SU | 1006378 | 3/1983 |
| WO | WO 01/04056 | 1/2001 |
| WO | WO01/34267 A1 | 5/2001 |

OTHER PUBLICATIONS

EPO—Patent Abstracts of Japan, Publication No. 11319805, Publication Date: 224–11–99, Yoshio, Separation of Gaseous Mixture utilizing Gas Hydrate and Method for Desalting Seawater—English language abstract.

XP–002143497 SU1328298 English language abstract.

Max et al., "Extraction of Methane from Oceanic Hydrate System Deposits", Offshore Technology Conference, Paper No. 10727, pp. 1–8 (1999).

Max and Lowrie, "Oceanic Methane Hydrates; A "Frontier" Gas Resource", *Journal of Petroleum Geology*, vol. 19(a), pp. 41–56 (Jan. 1996).

Max and Dillon, "Oceanic Methane Hydrate: The Character of the Blake Ridge Hydrate Stability Zone, and the Potential for Methane Extraction," *Journal of Petroleum Geology*, vol. 21(3), Jul. 1998, pp. 343–357.

Max, M.D., "Oceanic Methane Hydrate: The Character of the Blake Ridge Hydrate Stability Zone, and the Potential for Methane Extraction," Author's correction, *Journal of Petroleum Geology*, vol. 22(2), pp. 227–228 (Apr. 1999).

Max and Chandra, "The Dynamic Oceanic Hydrate System: Production Constraints and Strategies," Offshore Technology Conference, Paper No. 8684, pp. 1–10 (1998).

Max et al., "Methane–Hydrate, A Special Clathrate: Its Attributes and Potential," *Naval Research Laboratory*, NRL/MR/6101–97–7926, pp. 1–74 (Feb. 28, 1997).

Max and Lowrie "Oceanic Methane Hydrate Development: Reservoir Character and Extraction," *Naval Research Laboratory* (NRL), OTC 8300, pp. 235–240.

EFFICIENCY WATER DESALINATION/ PURIFICATION

This Application claims the benefit of Provisional U.S. Application Ser. No. 60/252,411, filed on Nov. 22, 2000; Provisional U.S. Application Ser. No. 60/255,066, filed on Dec. 14, 2000; and Provisional U.S. Application Ser. No. 60/264,326, filed on Jan. 29, 2001, the disclosure of each of which is incorporated by reference.

FIELD OF THE INVENTION

The inventions disclosed herein relate to desalination or purification of saline or otherwise polluted water using gas hydrates (referred to herein as "desalination" for simplicity but to be understood as encompassing other types of water purification). More particularly, the inventions relate to open-water systems (or partially open-water systems) for hydrate-based desalination or purification (although certain methodologies disclosed herein may also be used in fully land-based installations) and, in another aspect, to vaporization of Liquified Natural Gas (LNG),.

BACKGROUND OF THE INVENTION

Desalination or purification of saltwater or otherwise polluted water using hydrates is known in the art. For example, as illustrated in Max et al., U.S. Pat. No. 5,873,262, a hydrate-based fractionation column can be located in the open ocean. The column extends downward far enough for the lower portion of the column to be located at a depth where the water pressure is high enough and the water temperature is low enough for methane hydrate to form spontaneously (and remain stable) upon introducing a hydrate-forming substance (e.g., methane gas) into the lower portion of the column. The hydrate-forming substance combines with seawater, which enters the column freely through its open lower end, and forms naturally buoyant methane hydrate. The methane hydrate rises naturally within the column into a region where pressure and temperature conditions are such that the hydrate no longer is stable, and the hydrate dissociates ("melts") naturally to release the hydrate-forming substance (e.g., methane gas) and fresh water which has been extracted from the saltwater via the hydrate. The fresh water is collected, e.g., for drinking or other purposes, and the hydrate-forming substance is captured and recycled for reuse in the process.

A variety of gas hydrate-forming substances are known in the art and include hydrocarbons besides methane (including but not limited to ethane, propane, butane, cyclopropane, cyclobutane, and mixtures thereof), carbon dioxide, and various mixtures of substances including one or more hydrate-forming substances. It is also known in the art that certain gas hydrate-forming substances can be mixed with the water to be treated in liquid form. (Therefore, unless otherwise specified, the inventions claimed herein in terms of a "hydrate-forming substance" are to be interpreted as encompassing any and all such species of gas hydrate-forming substances.)

The temperature of the water to be treated is an important parameter which bears on the formation of hydrate. The colder the water used for hydrate formation, the lower the pressure at which the hydrate will form for a given hydrate-forming substance. Additionally, for a given volume of water to be treated, using colder water allows more hydrate to be produced before the temperature rises (as a result of exothermic formation of the hydrate) to a level where hydrate will no longer form spontaneously at a given depth.

In some restricted bodies of marine and other water such as the Mediterranean Sea, surface water—particularly during the winter and spring—may be cooler than water at depth. In other areas where stratified watermasses or upwelling or downwelling watermasses occur, the coldest water in a local sea area may be found at a horizontal level somewhere between the surface and a water depth which provides the requisite pressure for hydrate formation.

Furthermore, depending on the hydrate-forming substance being used, the fractionation column may have to extend relatively deep into the body of water in order for the pressure at the depth where the hydrate-forming substance is introduced into the water to be treated is suitably high for hydrate formation. For example, U.S. Pat. No. 5,873,262 refers to feeding methane into seawater at depths exceeding 100 meters—a depth at which pressure exceeds 11 times atmospheric pressure (ten meters of water depth for each additional atmosphere of pressure). Therefore, the energy costs associated with pumping the methane gas (or other gaseous hydrate-forming substance) which has been released upon dissociation of the hydrate back down to depth represents a significant cost of operation.

With respect to vaporization of Liquified Natural Gas, the LNG industry is based on the formation of LNG as a means of transporting it to markets from a producer country, where transport of the gas by pipeline or other means is not possible or is commercially of less benefit. LNG is a man-made substance that is made by liquification of natural gas by a process of refrigeration and compression. It is commonly stored at its boiling temperature of about −162 degrees C. in highly insulated vessels that are pressurized slightly above atmospheric pressure (e.g., approximately 5 psig above atmospheric pressure). Vaporization of LNG during transport absorbs heat, which acts to keep the liquid cold. The vapor is vented, usually to fuel a combustion engine of some type, and the pressure and temperature in the vessel remains constant.

LNG is imported into the United States to make up a shortfall in North American natural gas production. In part, the transition from liquid petroleum fuels to natural gas is being driven by the fact that for a given unit of energy, natural gas is a cleaner source of fuel for combustion. Methane has the highest hydrogen-to-carbon ratio of any hydrocarbon, and it burns cleaner with fewer toxic emissions, which has caused it to be considered the combustible fuel "of the future." This has led to environmental legislation requiring transition to gas fuels.

Because many natural gas pipelines in the United States are old and have bottlenecks that restrict transport of gas at peak periods, the import of natural gas, as LNG, directly to the target market without the construction of pipelines is an advantage over building new or expanding old pipelines.

When the LNG reaches its destination, it must be vaporized or converted back to a gaseous form in order to be distributed as gas and used as a combustion fuel. Presently, the energy requirement for the vaporization process is achieved by a process of "submerged combustion." Energy must be expended to compensate for both the simple warming of the LNG/gas and the endothermic change of state from liquid to gas. In this method, the LNG is passed through a large assembly of pipes that are submerged in a water bath that is heated by combustion of some fuel (usually part of the gas load itself). The vaporization achieved using this process consumes fuel in relatively large and expensive apparatus that demands special maintenance, especially with respect to unwanted biosystems in the water bath.

As a byproduct of the combustion process that heats the vaporization water bath, exhaust is created, which contributes to pollution. Emissions are mitigated by bubbling exhaust through the water bath. However, this results in some of the combustion products becoming dissolved in the water, which commonly renders it acidic and produces a potential for corrosion and for a situation where the water bath may become a hazardous material.

No commercial products (of which I am aware) are derived from the existing thermal vaporization process during the vaporization of LNG.

SUMMARY OF THE INVENTION

The present inventions provide a number of different means by which to increase the efficiency and benefits of gas hydrate-based desalination or water purification. According to one aspect, the invention recognizes that in some instances, water that is the coldest—and hence most conducive to formation of gas hydrate—in a naturally occurring body of water may be found at depths other than that at which the hydrate formation region of an open-water (e.g., marine) hydrate fractionation desalination installation will be located. In particular, the coldest water may be found at depths above (i.e., less than) those which yield pressures necessary to support hydrate formation (and hence above the depths at which the hydrate formation region of the installation should be located). Alternatively, the coldest water may be located below the depths at which the hydrate formation region of the installation is located, e.g., where the economics of construction limit the depth to which the installation extends.

Therefore, according to the invention, water is drawn from a depth yielding water to be treated that is colder than, and hence preferable to, ambient water found at the level of the hydrate formation region, and that colder water is brought to the formation region. In the illustrated embodiment, water to be treated is drawn from above the hydrate formation region, but the claimed invention embraces drawing water to be treated from below the formation region, as well. Moreover, in the illustrated embodiment, the water intake system is configured to selectively access water to be treated from a number of different levels so that the level from which water to be treated is drawn may be varied depending on where the coldest water is to be found.

Preferably, the water to be treated is brought to low enough pressure depths before being introduced into the hydrate formation region of the fractionation column that non-hydrate-forming gas that is dissolved in the water to be treated is exsolved. Additionally, the water to be treated preferably is pre-treated by having an initial, pre-treatment amount of hydrate-forming substance mixed with it to promote hydrate formation. The water to be treated may also be cooled by supplemental means before being delivered to the hydrate formation region, either by supplemental cooling or refrigeration means or by being passed in heat-exchanging relationship with hydrate that is dissociating endothermically in the dissociation region of the installation.

The invention further recognizes that significant savings can be realized by using a pre-pressurized source of gas hydrate-forming substance and, upon the subsequent dissociation of hydrate formed from the hydrate-forming substance, passing the substance downstream for use in a downstream application instead of reprocessing it and pumping it back down to depth for further use in the hydrate fractionation desalination process. Thus, in accordance with this aspect of the invention, pre-pressurized hydrate-forming substance may be drawn from undersea deposits, e.g., of methane (and possibly other hydrocarbon gases) and injected directly into the hydrate formation region of a hydrate fraction installation with little or no additional pumping or pressurization. Upon dissociation of the hydrate, the hydrate-forming substance, e.g., methane (and other gases, as appropriate), is passed downstream for appropriate use thereof.

Alternatively, Liquified Natural Gas (LNG) may be used as the hydrate-forming substance. In that regard, in another aspect, the invention provides a means for vaporizing LNG using hydrate thereof to do so, with the LNG being passed downstream (e.g., ashore) after the hydrate has dissociated. If the LNG is injected into saltwater, e.g., in an open-water marine installation, fresh water can be obtained from the saltwater as a highly desirable "by-product" of the LNG vaporization.

Moreover, using LNG as the gas hydrate-forming substance has an attendant effect that significantly increases efficiency of the desalination fraction process. In particular, when it is injected into the water to be treated, the LNG rapidly vaporizes underwater, and vaporization is an endothermic process. At the same time, the LNG forms hydrate, which is an exothermic process. The heat released upon hydrate formation is substantially consumed by the LNG vaporization process and, as a result, residual brines (saline enriched fluid "left over" after hydrate formation) are heated to less extent by the heat of hydrate formation than would be the case where such heat of hydrate formation is not consumed. Because elevating the temperature of the water in which hydrate forms reduces the efficiency of the process in terms of hydrate-forming capacity of a given volume of water, consuming the heat of hydrate formation in the LNG vaporization process limits temperature rise of the residual brines and therefore increases the efficiency of the hydrate fractionation desalination process.

In another aspect, the invention provides a hydrate fractionation desalination installation—e.g., an open-water or marine installation—in which multiple fractionation columns are provided with a common water collection section into which they all release fresh or purified water. The fractionation columns and the common water collection section are cooperatively configured so that the columns can be removed, e.g., for servicing, and the associated fitment "capped" so that the desalination process can continue without the removed column.

In another aspect, the invention provides a hybrid hydrate fractionation desalination installation having a subsea hydrate formation and thermal/salinity equilibration installation that is located on the seafloor, generally close to land, and a hydrate dissociation installation that is located on land. A connector assembly provides communication between the two installations, so that hydrate formed in the subsea installation can pass up and into the land-based dissociation installation.

Such a hybrid configuration maximizes the cooling/refrigerant potential of the hydrate, which dissociates endothermically, since heat released by exothermic formation of the hydrate is dissipated into the ocean via the equilibration section. Preferably, a "slug" of hydrate-rich slurry is formed in the connector assembly and then released to flow into the land-based dissociation installation. Preferably, the land-based installation is a pressurized installation, i.e., one which is configured to process hydrate in a batch mode.

BRIEF DESCRIPTION OF THE DRAWINGS

These and other features of the invention will become clearer in view of the Detailed Description of Preferred Embodiments and the FIGURES, in which.

DETAILED DESCRIPTION OF PREFERRED EMBODIMENTS

Figure 1:
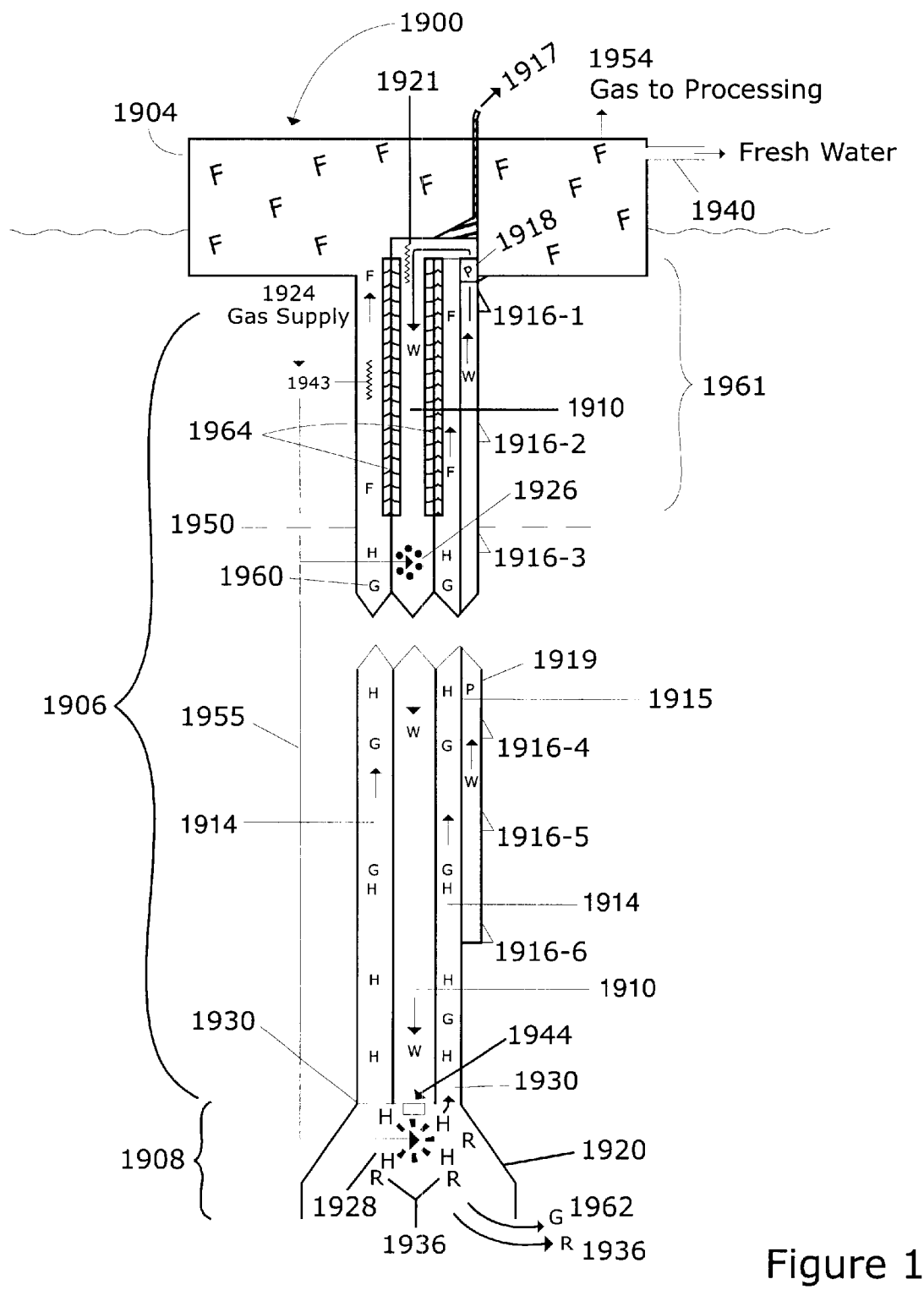
FIG. 1 is a schematic, side elevation view of a desalination fractionation apparatus in accordance with one aspect of the present invention.

FIG. 1 illustrates a preferred embodiment of a hydrate fractionation desalination apparatus 1900 in accordance with one aspect of the present invention. This embodiment enables the water to be treated in a marine installation to be accessed from a variety of different depths of choice so as to obtain optimally cool water. The desalination apparatus 1900 includes a water and gas collection and separation section 1904 and a column 1906 extending downward into the water, as is generally known in the art. The lower end of column 1906 is located within a pressure-depth range sufficient for the spontaneous formation of hydrate (H) in the hydrate formation section 1908 of the column 1906, where the water to be treated is mixed with the hydrate-forming gas (or other appropriate hydrate-forming substance) to form buoyant hydrate (H).

The column 1906 preferably has more than one separate passage, e.g., a pipe or column 1910 which transports the water to be treated (W) downward to the hydrate formation section 1908, and a separate pipe or column 1914 through which the gas hydrate (H) can rise buoyantly to the upper dissociation region 1961. In a preferred embodiment of the present invention, the pipes 1910 and 1914 are concentrically arranged, with one inside the other. For example, the treatment water delivery pipe 1910 carrying the water to be treated is located within the hydrate delivery pipe 1914 containing the rising hydrate, as illustrated in FIG. 1. This arrangement has the potential to minimize current drag from moving seawater while simplifying the manufacture and assembly/disassembly process of each column.

In an alternative arrangement (not shown) of the two water-course pipes, the pipes can be arranged in a side-by-side lay-out or in a grouping of a number of pipes in a multiple-pipe column, where hydrate will rise up more than one hydrate delivery pipe 1914. In another alternative arrangement (not shown) of the water-course pipes, more than one treatment water delivery pipe 1910 and more than one hydrate delivery pipe 1914 may be employed. Other arrangements of the water-course pipes and variations of their numbers are possible.

Because the pipes comprising the column will be operating at ambient pressure for all depths along their length, the material from which the column is fabricated need only have sufficient strength to maintain its approximate cross-sectional area and shape. Thus, semi-rigid or flexible material that may be sewn, glued, or otherwise attached together and having helical or other strengtheners allowing it to hold its shape are fabricated in portable sections and assembled on site. One example of a suitable material is modern parachute fabric, or where particular strength requirements are important, synthetic fabric such as or similar to KEVLAR or ballistic nylon may be preferred. Other fabrics are also available. Likewise, formed flexible plastic may be used on collars and joins of the system and where fabric sections must be joined to different materials.

In order to access and draw water to be treated from different depths, an exterior water acquisition pipe 1915 is provided which contains a number of separate orifices 1916 along its length that can be opened individually as desired, as illustrated in FIG. 1. Provision of the "multi-port" water acquisition pipe 1915 allows water that is determined to have the most appropriate natural characteristics (e.g., lowest temperature) for hydrate formation to be drawn from the most appropriate one (or ones) of the multiple orifices 1916. In general, the coldest water that can be accessed will be the most desirable. Water drawn into the acquisition pipe 1915 is first drawn up toward the surface and then impelled by pump (P) 1918 down the water delivery pipe 1910 to the base of the column, where hydrate-forming substance is introduced.

A number of different types of commercially available valves and control apparatus can be fitted onto a water acquisition pipe 1915 that has a number of intake points provided at fixed depths to provide for controllable water intake. A preferred example consists of a self-cleaning gate valve on each opening that is operated by hydraulic power (possibly with a screw fitting to provide mechanical advantage). An alternate type of control apparatus is solenoid operated, and a further type would consist of a fully mechanical linkage. It may be necessary to have pumps at depths within the water intake pipe, as well as a main pump at the top, in order to assist upward movement of water. Screens, which act as coarse filters, should be of the self-cleaning type known in the ocean engineering community so as to minimize maintenance.

Where it is desirable to vary the depth of water intake to depths between those that could be provided on a fixed depth basis, a flexible pipe that rides up and down on a frame fixed to the column can be used. In that case, a single intake opening with a pump assembly near the bottom would be used instead of multiple openings.

At least two variable depth water acquisition pipes preferably are provided for each column so that a continuous flow of intake water can be provided, even when one of the water acquisition pipes has been removed for service such as maintenance, repair, or replacement. Ideally, there should be three water acquisition pipes so that any two can be used for simultaneous operation (although for simplicity only one is illustrated).

Alternatively, instead of a single water acquisition pipe with multiple inlet orifices, multiple pipes each having a single inlet orifice can be provided, with each orifice located at a different depth. Still further, a configuration in which the water acquisition pipe is constructed with an orifice section that moves the orifice up or down to different depth is also envisaged.

Significantly, atmospheric and other gases that are dissolved to the point of saturation in the water to be treated will come out of solution (i.e., exsolve) when the water to be treated is brought up to the surface (since the conduits through which it flows are not pressurized). Gases that exsolve from the seawater as it is brought toward the surface before it is pumped back down to hydrate-formation depth are collected near the top of column 1906 and are removed through pressure-release gas trap 1917. Preferably, the pump apparatus 1918 is configured to create turbulence in the water to help cause as much dissolved gas to come out of solution as possible. Other pumps (P) 1919 within the water acquisition pipe may be needed along with pump 1918 to maintain mass flow balances.

Where surface or intermediate-depth water that has first been brought to near the surface is subsequently delivered to the hydrate formation region 1908 at greater depth, the water will be highly undersaturated in atmospheric and other gas. This degassed, undersaturated water can absorb hydrate-forming gas or gases (injected at a level 1926 at which hydrate will not yet form in order to promote eventual hydrate formation) better than seawater that is saturated in normal atmospheric gases (such as nitrogen, oxygen, and carbon dioxide) can absorb hydrate-forming gas or gases. Maintaining operational conditions such that gas will not exsolve from the seawater in which hydrate has subsequently formed is beneficial to the process as a whole because otherwise gas bubbles will be released that will rise up the hydrate-delivery pipe 1914 and disturb the hydrate dissociation process or add non-hydrate-forming gas to the water and gas collection and separation section 1904.

In addition to hydrate-forming gas, materials naturally occurring in seawater or artificial material that acts in the same way to promote nucleation and growth of hydrate may also or alternatively be injected into the seawater, e.g., at level 1950, to foster subsequent hydrate crystallization.

In operation of the installation, water to be treated is drawn into the water acquisition pipe 1915 and is transported via pump 1918 (and 1919, if present) to the hydrate formation region 1908, which is open at its base to the sea. This pumping does not require excessive force because the densities of the water to be treated in the delivery pipe, which is descending 1910, and the water in the sea at the depth of the hydrate formation region, which is open to the sea, are similar. The water/hydrate mixture in the hydrate delivery pipe 1914 is of lower density and will tend to both stand above the sea surface and to allow residual water to exit downward.

A shroud 1920 is provided for hydrate formation 1928 so as to provide a large enough volume to allow for complete hydrate formation from introduced hydrate-forming gas 1924. The shroud 1920 may be buffeted by both ocean currents and water flows from within the apparatus and is, therefore, preferably formed from a rigid or semi-rigid material such as plastic, composite material of the character of hard rubber-like material, semi-rigid glass fiber, or some other suitable material. The shroud is preferably relatively heavy and/or affixed firmly to a frame suspended from the upper part of the marine installation.

Hydrate-forming gas 1924 is supplied to the hydrate formation region 1908 via gas supply pipe or column 1955 and forms positively buoyant hydrate therein. The positive buoyancy hydrate (H) 1928 formed in the hydrate formation region 1908 then rises into the base 1930 of the hydrate delivery pipe 1914. Residual water (R) 1936 carrying dissolved and suspended material "rejected" during hydrate formation flows downward and is expelled from the shrouded base 1920 of the hydrate formation region 1908. In normal operation, the volume of water delivered to the hydrate formation region 1908 is greater than the volume of residual water 1936 removed from the base of the column and the volume of water extracted by incorporation in gas hydrate. On occasions where the water flow is insufficient to flush residual brines, cooling of the brines by heat exchange with the surrounding ocean water will increase their density, and this water will tend to sink away from the base of the column, especially where excess water may leave the base of the hydrate delivery pipe 1924.

Figure 2:
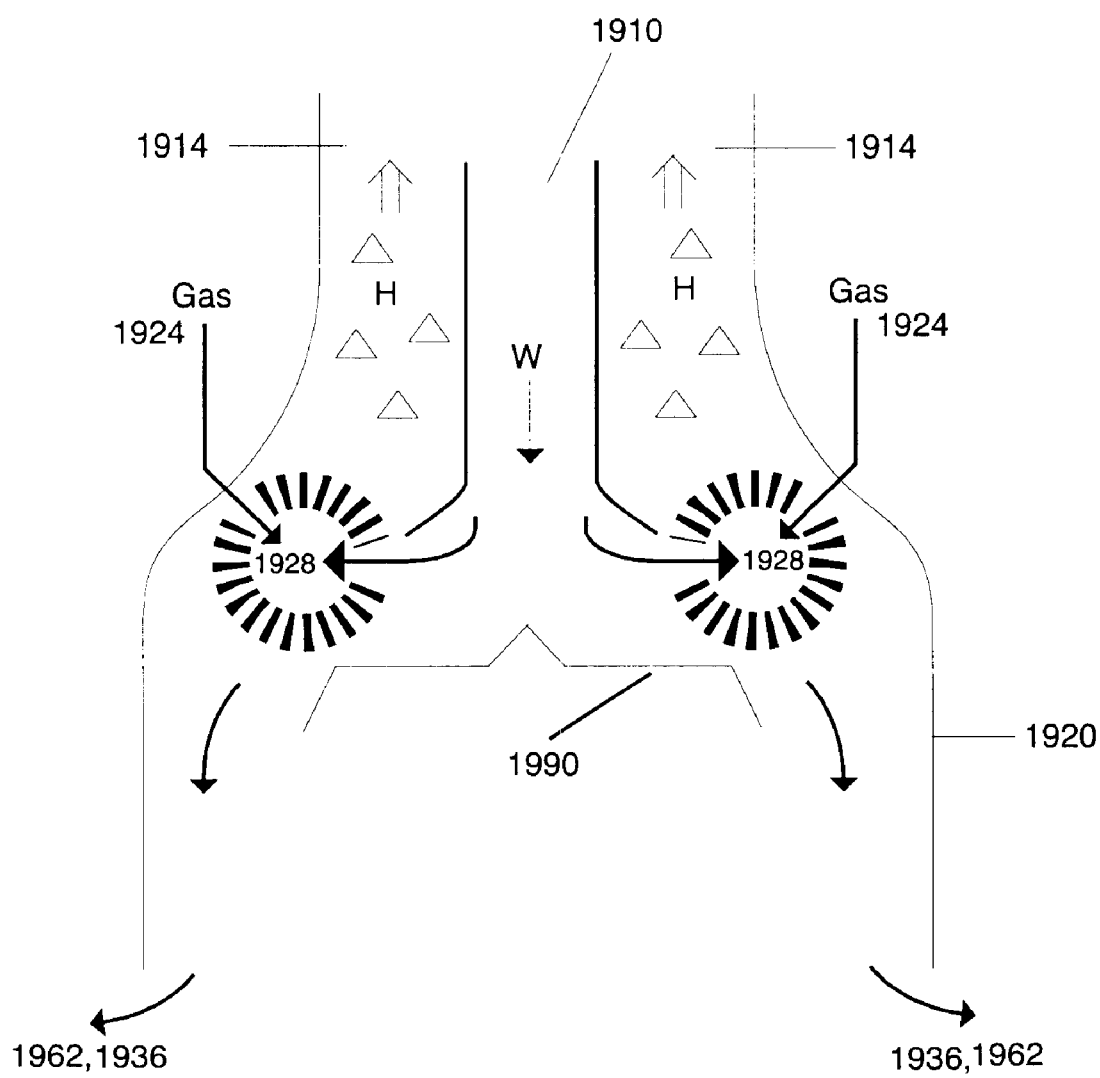
FIG. 2 is a schematic, side elevation view of a hydrate formation region of the desalination fractionation apparatus shown in FIG. 1.

In order to form hydrate in the most efficient manner, it is necessary to control the flow of water to be treated where it enters the hydrate formation region 1908. This is because the pipe 1910 may otherwise form a waterjet that maintains a coherent form. If not controlled, the momentum of the watermass introduced into the hydrate formation region may cause it to be driven below the shrouded hydrate formation region, where it would escape from the apparatus. Therefore, an apparatus should be provided which controls the water flow and localizes hydrate formation to ensure that the hydrate will rise into the hydrate delivery pipe 1914. For example, as illustrated in FIG. 2, a baffle 1990 is suspended below the treatment water delivery pipe 1910 so that the water is forced to spread laterally. Alternatively, the baffle can be replaced by horizontal water pipes or a continuous horizontal duct (not illustrated). All of these configurations divert the water-to-be treated laterally to a region where it is mixed with the hydrate-forming gas 1924. The hydrate formation can be accomplished in a circular array or in whatever form is necessary to cause the hydrate to form immediately so as to rise into the hydrate delivery pipe 1914. Variations of the embodiments illustrated in FIG. 2, and other means for achieving control of the flow of water to be treated, may also be employed.

Water flow rate through the hydrate formation region 1908 is governed by the rate at which water to be treated is pumped downward in the treatment water delivery pipe 1910, the volume and rate of delivery of hydrate-forming gas, and the size of the water passages in the hydrate-formation region 1908. Mass flows are preferably controlled so that the water flow out of the hydrate formation region does not entrain and remove gas hydrate downward and out from the apparatus. To maintain the flow of water to be treated and hydrate in their respective pipes, a one-way valve 1944 (FIG. 1) is provided at the base of the treatment water delivery pipe 1910 to prevent hydrate from rising into it. In addition, the pressure-release gas-trap 1917 at the top of the treatment water delivery pipe 1910 will allow gas to escape from the pipe if hydrate or hydrate-forming gas inadvertently enters the pipe.

In the present invention, sufficient quantities of water to be treated are moved to the base of the column so that some of the water, along with residual water (brines) remaining after hydrate has been formed from it, is carried away by escaping from the base of the hydrate-formation region. Because the residual water 1936 is warmed by the exothermic hydrate-formation reaction, this constant expulsion of water from the treatment water delivery pipe 1910 and more dense residual water from the hydrate formation region allows the temperature in the hydrate-forming region to be maintained at a level low enough for continuous formation of hydrate. It also ensures that the removed brines are not highly elevated in salinity and temperature, thus ensuring that the residual waste water 1936 has minimum environmental impact. Although the geometry of the base of the treatment water delivery pipe should mainly preclude hydrate from entering it, keeping water flow high in the treatment water delivery pipe 1910 will also prevent hydrate from rising into it After formation, the hydrate (H) rises in hydrate delivery pipe 1914 until it reaches a depth (illustrated at 1950) at which it is no longer stable at the ambient temperature and pressure. Above this depth, the hydrate begins to dissociate into fresh water (F) and the hydrate-forming gas 1924, which may be recaptured and processed for reuse in another cycle of hydrate formation by means of gas processing apparatus 1954.

Where the fresh water mixes with seawater, or where it is formed from incompletely diluted seawater, the water is between seawater and fresh water in its salinity and comprises mixed water (G), as illustrated in FIG. 1. Mixed salinity water 1962 is allowed to escape freely from the base of the hydrate formation region 1908, from below the lowest point of the region's shroud 1920.

The exterior wall between the hydrate delivery pipe 1914 and the surrounding seawater preferably has good insulating properties. The walls between the hydrate delivery pipe (or pipes) 1914 and the treatment water delivery pipe (or pipes) 1910, however, should allow for heat exchange—at least in the region of hydrate dissociation 1961—to help cool the descending input water to be treated. As illustrated in FIG. 1, heat exchangers 1964 are provided in the shallow depth region of the apparatus, above the level of hydrate stability 1950, where hydrate dissociation takes place.

Chilling the water in the hydrate delivery pipe 1914 will have a tendency to make the hydrate more stable and will allow the hydrate to form and remain stable at shallower depths. Depending on seasonal and special climatic and oceanographic conditions, the actual level of the hydrate phase boundary 1950 will vary within a range of levels within the column 1914. Where substantial hydrate rises above the normal position of the top of the hydrate delivery pipes 1914, additional heat exchangers are preferably provided in the fresh water and gas collection and separation section 1904.

Capturing as much of the cooling potential as possible from the dissociation reaction is desirable because the greater the volume of cold water and the lower its temperature delivered to the hydrate formation region, the more efficient the process of hydrate formation will be. In addition, if the newly formed hydrate is chilled during its ascent, the dissociation process will be restricted to a shallower depth range. This is desirable because the more the dissociation process can be kept to shallow depths, the shorter the start-up time (in terms of establishing a fresh water region at the top of the hydrate delivery pipe and collector section) will be; less mixing with interstitial water will occur; and the greater the production of fresh water will be.

Cooling the water to be treated is beneficial to the process of hydrate formation not only when relatively warm water is encountered at the fall depth of the hydrate fractionation desalination apparatus, but also when the water to be treated is drawn from water exhibiting the more typical open ocean temperature profile (temperature generally decreasing with increasing depth). Cold water can be drawn from depth, as described above, and made even colder before it is delivered to the hydrate formation region. The cooler the water arriving in the hydrate-formation region, the smaller the volume of water that has to be delivered for the formation of a particular volume of hydrate, and the more efficient the process becomes in terms of the amount of hydrate formed from a given volume of water.

In addition, by cooling the water to be treated, the density of that water will increase, and it can be increased to the point where the water to be treated is heavier than the ambient seawater. Where this happens, the water to be treated will tend naturally to flow through the apparatus. However, pumping is still required to control the rate of water delivery to the hydrate formation zone and to maintain mass balances and to ensure desired dissociation.

Where it is desired to accelerate the process of hydrate formation (such as, for example, when beginning a production run), a refrigeration unit 1921 may be provided within the stream of down-flowing water. Because it induces extra cost, artificial cooling of the down-flowing water to be treated is preferably performed for only a short period of time during start-up and until transfer of heat (cooling) from the water to be treated (by virtue of the endothermic dissociation of hydrate in the dissociation region 1961) adequately cools the down-flowing water.

In addition or alternatively to increasing efficiency of hydrate-based desalination by obtaining the water to be treated from an optimal temperature depth, if hydrate-forming gas is brought to the hydrate formation region of a desalination fractionation installation from an already pressurized supply, the cost of delivering the gas to the regions at the elevated pressures required for spontaneous hydrate formation can be substantially reduced. This is especially true because the main compression of a gas, in terms of the number of times the gas volume has to be reduced to, say, half its volume, is greatest when the gas is initially pumped from low or near atmospheric (one atmosphere) pressures. The concept of halving of volume is especially relevant with respect to pumping hydrate-forming gas to pressure because the pressure is directly related to depth in water. Halving a particular volume of one-atmosphere gas requires pumping to two atmospheres of pressure or about 10 meters water depth. Halving the volume again requires pumping to 30 meters water depth; halving again to 70 meters; halving again to 150 meters; halving again to 310 meters; and halving again (to $\frac{1}{64}$ the original volume) to 630 meters, which is a high enough pressure depth (about 64 atmospheres) to carry out efficient desalination through the hydrate fractionation technique.

Halving the volume from near-atmospheric to an (arbitrary) hydrate-forming pressure depth of 48 atmospheres thus requires halving the volume of a particular volume of hydrate-forming gas over five times, and the energy requirements for doing so are large. Therefore, if hydrate-forming gas that is already pressurized to about 20 atmospheres can be accessed as a source, compression to the (exemplary) 48-atmosphere depth can be achieved in a little over one volume-halving compression step.

Because energy consumption is directly related to pumping hydrate-forming gas to pressure, and that is the primary energy consumer in hydrate-based fractionation for large-scale seawater desalination, the overall cost of the process can be reduced significantly by using an already pressurized supply of hydrate-forming gas, such as exists in major pipelines or from the natural gas reservoirs. To wit, high-pressure hydrate-forming gas consisting mainly of methane can be found in a number of situations amenable for use in hydrate fractionation desalination installations. Some major pipelines on land, and pipelines bringing natural gas ashore from continental shelf and continental slope gas deposits, commonly operate at up to 3,000 psi (about 200 atmospheres). These are usually the major trunk and long-distance distribution pipelines, but in a number of instances, they are located near coastal areas of the United States.

Gas can be obtained and transported from some such elevated pressure source and delivered at the already elevated pressure to one or more hydrate fractionation desalination installations, and pressurized to the requisite hydrate-forming pressure by further pumping (if necessary) sufficient for its injection into the hydrate-formation region of an installation. After it has been utilized in a single cycle or "pass" through the hydrate fractionation installation (injection, hydrate formation, then dissociation), the gas is captured and can then be taken back to shore (in the case where it has been obtained from an on-shore source) or delivered to shore (in the case where it has been obtained from an off-shore source, e.g., from under the seabed) at a lower pressure than that of the source from which it was obtained (i.e., at between atmospheric and some slightly elevated pressure). (The gas that is passed through the hydrate fractionation desalination process may be partially dried before being incorporated in a local gas supply.) Alternatively, if desired, it can be maintained within a pressurized dissociation region following dissociation, from which it can be drawn subsequently.

In either case, using a hydrate fractionation installation to effect a pressure drop from a major, high-pressure gas-line or subsea gas source to a lower pressure gas line could replace existing apparatus currently used for depressurizing large volumes of natural gas, with the production of fresh water being a valuable "side benefit." In fact, the energy cost for desalinating salt water by reverse osmosis is on the order of up to 30 kW·hours per thousand gallons of fresh water produced, depending on the salinity of the water (water more saline than normal sea water is higher cost), whereas the energy cost of the pressurized gas pass-through drops to less than 12 kW·hours per thousand gallons of fresh water produced regardless of salinity, when using an already pressurized source, as described above and further below. Moreover, I have estimated that the cost to construct a hydrate-based desalination installation as per the invention would be on the order of about one-third to one-quarter the cost of such currently used desalination installations (including water intake and pre-treatment apparatus).

Where the hydrate-forming gas can be found at high enough pressures so that when it is delivered at these pressures to the hydrate-formation region of the fractionation installation, it does not need additional pressurization to reach the pressure of the, the entire energy cost of gas compression is saved. In hydrocarbon extraction operations, for instance, gas pressures in the tie-back pipelines from subsea wellheads to offshore gathering facilities that may be relatively close to shore are commonly on the order of 5,000–8,000 psi (about 340 to 545 atmospheres pressure). Gas wells on land also may feed into gas treatment apparatus at these pressures and often feed into main gas pipelines, which commonly have pressures up to 3,000 psi (about 204 atmospheres) over extensive distances. In other words, sources of gas that is already at high enough pressures so that it is near or above the pressures required for direct injection into the hydrate formation region without additional pressurization may commonly be found near to large bodies of saline water in areas where new sources of fresh water are desired.

Where hydrate-forming gas is injected into the hydrate forming region at a pressure higher than that of the hydrate formation region, the gas will decompress as it is injected into the installation and, in doing so, expand in volume, thus providing at least a slight cooling potential that can absorb some of the heat produced by the exothermic hydrate formation reaction. This cooling effect is beneficial to the formation of gas hydrate because it allows more hydrate to be formed from a given volume of water.

Locations where high pressure gas is derived from nearby gas fields and areas through which high pressure gas lines pass are often dry or desert areas near large bodies of saline or polluted water. In these regions, gas hydrate fractionation desalination installations may be established within the sea or immediately adjacent to it, and gas from the high pressure pipelines suitable for forming gas hydrate may be used directly or with only a little increase in pressurization. By using the gas at its pipeline pressure, there may be no requirement to pump gas to pressures suitable for injection in the hydrate-forming area, which would dramatically lower the energy cost of operations.

Figure 3:
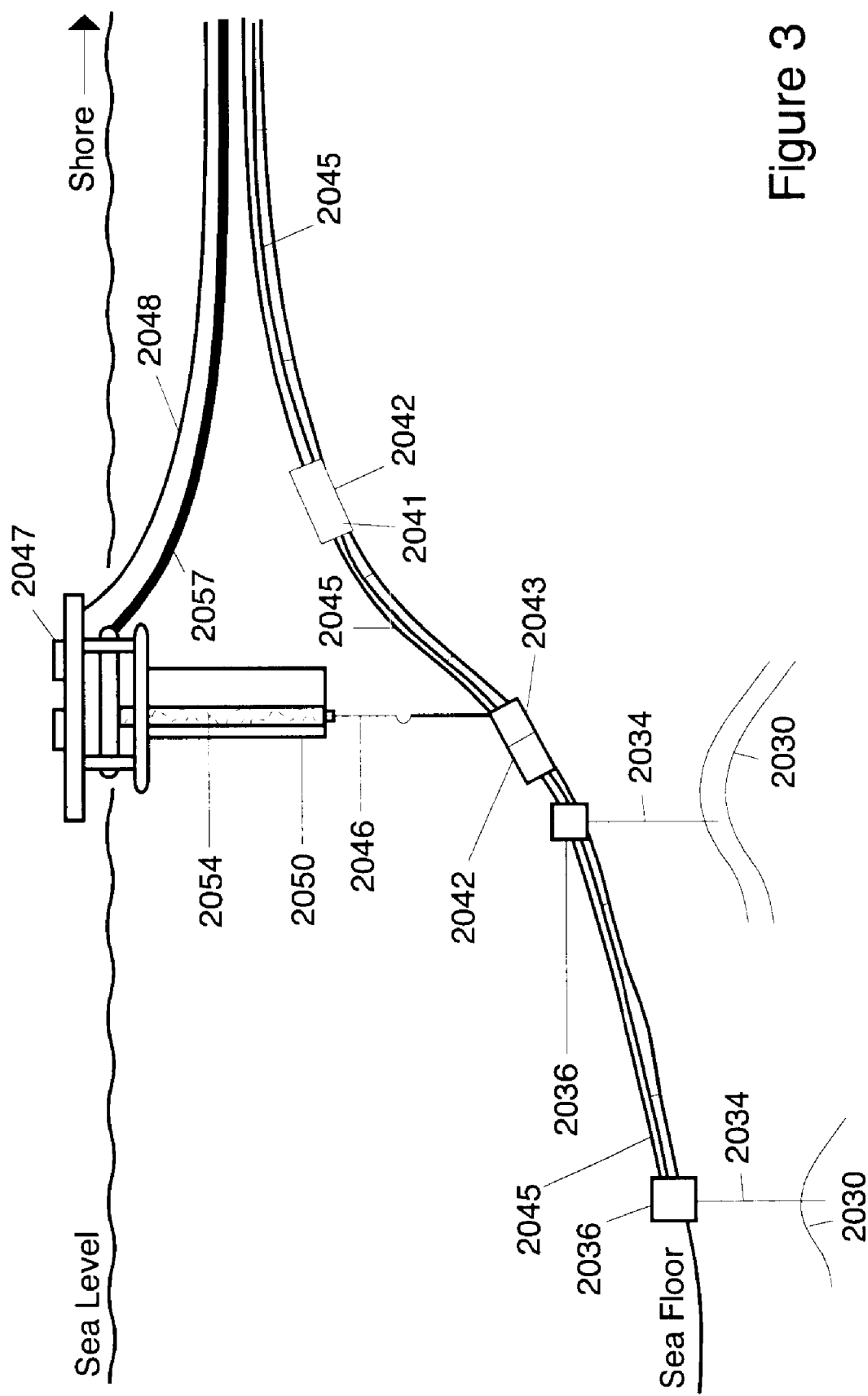
FIG. 3 is a diagrammatic, side elevation view of a marine hydrate fractionation desalination and water purification installation in accordance with another aspect of the invention.

In one exemplary embodiment, a marine hydrate fractionation installation is provided in which hydrate-forming gas is derived from gas deposits in the seafloor, as illustrated in FIG. 3. Gas and fluids are extracted from undersea deposits 2030 via pipelines 2034 extending from seafloor wellheads and manifolds put in place for the purpose of gathering the hydrocarbon petroleum and gas 2036. These wells can be found in a variety of locations, including, for example, in relatively shallow water and near land. The gas and fluids from the submarine deposits 2030 are carried by seafloor pipelines 2045 to the gas processing apparatus 2042 where, for example, the gas is prepared by drying and other preparations for use as a hydrate-forming gas. From the gas preparation apparatus 2042, the hydrate-forming gas is provided by a manifold 2043, which controls gas flow and directs it either directly to shore by pipeline 2045 or to the floating hydrate desalination installation 2047.

For gas fields nearer to shore, the gas and various petroleum fluids can be separated from seawater with which they are "intermixed" after the extracted material has been transported a short distance ashore by pipeline, rather than on the seafloor. However, in deep water (for example, in new offshore wells off of Brazil and the central West Africa coasts, as well as offshore from Norwegian coast (among other places)), gas and the various fluids being brought to the surface of the seafloor (such as oil and groundwater) are now being separated in apparatus (e.g., apparatus 2042) established on the seafloor near the wellhead and in intermediate locations along the pipeline. Often, several separation apparatuses 2042 are provided along a pipeline 2045 to shore to carry out further processing, as needed.

A flexible gas pipeline 2046 leads from the manifold of a separation apparatus 2043. FIG. 3, showing only one hydrate fractionation column for simplicity, illustrates a situation where the water depth of the wells and separation apparatus is greater than the water depths required for a marine desalination apparatus 2047. In other cases, where the pressure in the gas reservoir is high enough to allow direct injection into the hydrate formation zone of a column, gas may be pumped from shallower water into deeper water where a marine hydrate fractionation desalination apparatus is established.

Where hydrate-forming gas is supplied from the seafloor to the fractionation installation already pressurized, the operating costs of the desalination apparatus are substantially lower than in the case where the gas must be processed and re-pumped to the hydrate-forming depth 2050 of the column 2054. Gas taken from the seafloor is passed through the hydrate fractionation desalination installation and is then transported directly to shore through a pipeline 2048 leading to shore. Thus, instead of the gas being passed directly to shore from the undersea installation, it first is used as the hydrate-forming gas in a hydrate fractionation desalination installation and then, afterward, is passed to shore. The fresh water produced by the desalination apparatus is taken ashore in a pipeline or multiple pipelines 2057.

In addition to partially or fully naturally pressurized gas being used to provide the hydrate-forming gas supply in marine installations, naturally pressurized gas may be used in installations established onshore. Where suitable hydrate-forming gas is recovered from marine wells where pipelines from an offshore gas deposit to shore are established, some of the gas can be transported in a pressurized piping. In addition, gas from pressurized wells in the vicinity of a land installation (and possibly a marine installation close to shore) can be transported in a naturally pressurized state through final pressure-control apparatus to the hydrate formation region of a hydrate desalination installation and used without artificial pressurization.

Figure 4:
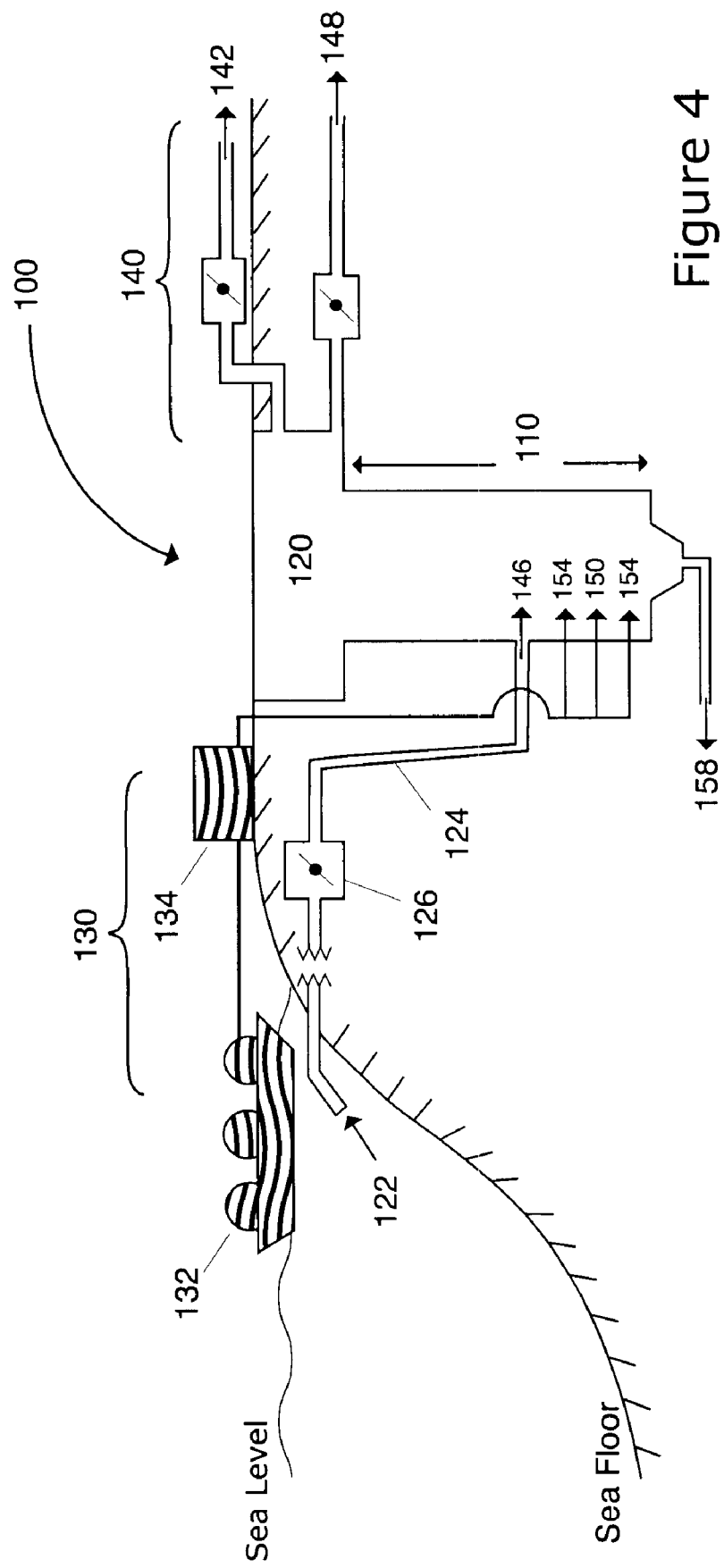
FIG. 4 is a diagrammatic, side elevation view of a hydrate fractionation column using Liquified Natural Gas in accordance with another aspect of the invention.

Alternatively, Liquified Natural Gas (LNG) can be used as the hydrate-forming substance. In such an embodiment, illustrated in FIG. 4, the vaporization of LNG constitutes part of a process of desalination by gas hydrate fractionation. The LNG, which is a hydrate-forming gas (in liquified form), is injected in naturally pressurized apparatus 100 into which seawater has been delivered. The apparatus 100 includes a shaft 110 in which the pressures and temperatures in its lower part are suitable for the formation of gas hydrate. The shaft 110 underlies a dissociation vessel 120, into which the hydrate rises (either due to its own buoyancy or due to a combination of the buoyancy of hydrate and any incorporated hydrate-forming gas that has not formed hydrate) and where the hydrate dissociates into fresh water and the hydrate-forming gas. Water is taken into the installation from a natural body of water 122 in which the installation is located and allowed to enter the shaft at a desired location by an intake system 124. Water input rate is controlled by a pump 126, although the shaft and most of the dissociation region 120 are capable of filling naturally by gravity flow of the input water, where no obstruction is encountered.

The vaporization/desalination/water purification apparatus is intermediate in position between where the LNG is delivered (upstream apparatus) 130, whether still remaining in the delivery ship 132 or in a temporary storage facility on land 134. Gas storage and distribution apparatus, and the apparatus for removing the gas (downstream apparatus) 140, where there is no processing of the gas for use in another cycle of hydrate formation, carry the gas produced by the dissociation of the gas hydrate 142 from the dissociation region and pass it onward for use as fuel or for other purposes. Fresh water is also removed from the dissociation region 148. Pumps (p) control water and gas output and regulate pressure within the hydrate dissociation region, which may be kept elevated above normal atmospheric pressure.

The composition of hydrocarbon gases in the LNG is likely to vary from load to load (and possibly within each load if separation has occurred). The other hydrate-forming gases besides methane (which comprises the greater part of LNG; usually no less than 90% of the total fluid) which may be present are ethane, propane, and butane. Any of these other gases can be expected to occur as part of the LNG because complete separation of the constituent natural gases is usually not done at the gas field. Small amounts of non-combustible gases such as carbon dioxide, nitrogen, helium, etc. that were in the original natural gas that was liquefied may also be present in dissolved form.

The variable nature of LNG is an important factor of which to be aware because for each mixture of hydrocarbon gases, the stability field will be somewhat different. For example, the minimum pressure depth required to form hydrate from LNG rich in propane or butane will be shallower (in the same temperature water) than LNG that is relatively poor in hydrocarbon gases other than methane. Therefore, the apparatus is designed to accommodate the range of LNG compositions likely to be passed through it because different mixtures of hydrate-forming gases have different fields of pressure-temperature stability.

In one embodiment, the injection points of water to be treated 146 and the hydrate-forming gas 150 are fixed so that the gas is injected at the deepest depth required for spontaneous gas hydrate formation. In another embodiment, the apparatus is configured to use LNG having various mixtures of constituent hydrocarbon gases. In such embodiment, apparatus is installed for delivering the LNG to the hydrate forming region at different depths 154. This apparatus consists of a delivery pipe system having infusion nozzles at different depths, where the particular nozzle used to inject the LNG can be selected and controlled. Any depth of injection below a level where the gas hydrate for that particular mixture of hydrate-forming gases will form spontaneously is suitable for the process of gas hydrate formation to take place.

The installation also has a pipe system that allows for injection of the water at about the same level at which the hydrate-forming gas is injected. This co-level injection of water and hydrate-forming gas results in the best thermodynamic conditions for the efficiency of the system because a minimal amount of the injected water will be warmed by the heat given off by hydrate formation. However, where the cost of carrying out variable-level water injection is not justified, the process of gas hydrate formation and fractionation will take place with the water to be treated injected from above, and the residual brines removed from the hydrate fractionation column from a subjacent exit 158.

The LNG should be kept refrigerated prior to its injection in the hydrate-forming region of the hydrate fractionation column. Refrigeration can be accomplished in a number of manners which are available to those skilled in the art.

The LNG can be safely vaporized by direct injection into the water to be treated, without any heating from combustion of fuel, where gas hydrate forms in the region where the LNG is injected. Thus, with this invention, there is no fuel consumed as a direct part of the process; consequently, there is no pollution from fuel combustion released either to the air or kept resident in water bath.

The reaction upon injection of the LNG is very energetic. Upon vaporization of the LNG, which will occur in the water being treated, the gas will expand considerably as compared to the size of the injected LNG bubble or stream, whose size and bubble density (as a function of water+ hydrate) is controlled to produce gas bubbles or streams of the desired character to accomplish hydrate formation where both solid hydrate is desired and where it is desired to retain some gas within the hydrate to accentuate buoyancy.

The heat released upon the formation of hydrate provides all the heat required to vaporize the LNG. When hydrate forms concurrently with injection of LNG, water in the hydrate formation region will not freeze, whereas if LNG were to be injected directly into water without the formation of gas hydrate, water might freeze in the region of injection.

Another benefit of using LNG (instead of compressed gas) as the hydrate-forming substance is that the efficiency of extraction of fresh water by incorporating water molecules from a particular volume of water into hydrate is increased. For example, the energy cost of forming hydrate from LNG can be calculated as follows, with certain assumptions:
1. LNG is 100% methane (Precise calculations can be made for all LNG gas mixtures).
2. No unrelated heat sink exists.
3. Fresh water flow rate is 10 l/min (9.26 mol/sec).
4. LNG flow rate is 1.54 mol/sec.

A basic energy balance was performed taking into account the following:
1. LNG heat of vaporization=9 kJ/mol.
2. Methane gas heat capacity=33.3 J/mol ° C.
3. Methane hydrate heat of formation=54 kJ/mol.

LNG enters the hydrate formation region at −161 '° C. and water enters the hydrate formation region at 1° C. The LNG rapidly vaporizes. This vaporized methane takes in heat, and its temperature increases to the equilibrium temperature, 1° C. Methane hydrate forms and gives off heat.

The following energies were calculated for the above example of water and hydrate-forming gas flows:
1. LNG vaporization produces a heat sink of about 13.86 kW.
2. Heating the gas in the LNG to the temperature of the hydrate-forming region causes a heat sink of about 8.26 kW.
3. Heat produced by the formation of the gas hydrate is about 83.66 kW.

The result of the reaction of LNG direct injection and simultaneous spontaneous gas hydrate formation is that energy of about 61.5 kW is produced in the hydrate-forming region. Thus, 61.5 kW of energy will need to be removed from the hydrate forming region to maintain an equilibrium temperature of 1° C. Reducing the energy produced in the hydrate formation region, which otherwise would heat the region, increases the efficiency of the water extraction process (for a steady-state situation) by about 25% (compared with gas injection) because with gas there is no heating or vaporization effect provided by the hydrate-forming material. In short, heat released upon exothermic formation of the hydrate is approximately consumed by the endothermic nature of the (underwater) heating and expansion of the LNG.

Where the efficiency of water extraction for any particular volume of water to be treated increases, a direct benefit is that this diminishes the amount of water that has to be passed through the gas hydrate fractionation desalination apparatus, thereby lowering stress on equipment and lowering costs. In addition, as less water is passed through the desalination fractionation apparatus, control of mass balances is easier to maintain because flow rates are lower, thus allowing both turbulent and lamellar flow areas to be controlled better.

Figure 5:
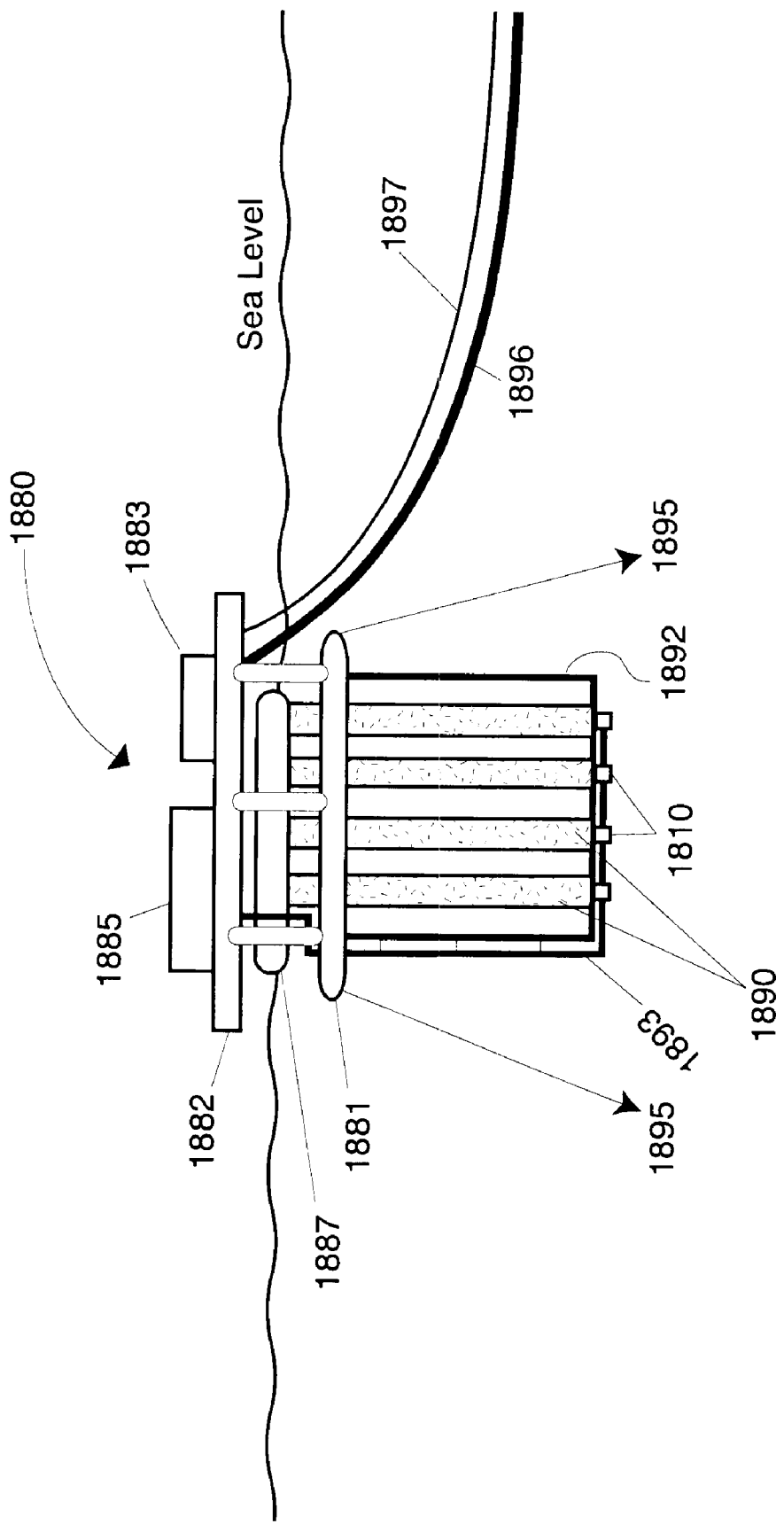
FIG. 5 is a diagrammatic, side elevation view of a multiple fractionation column, marine installation in accordance with another aspect of the present invention.

In addition to the techniques described above, efficiencies of scale can be obtained by using multiple fractionation columns in a given installation. FIG. 5 shows an example of such a multiple-column, marine-based hydrate desalination and water purification installation established on a semi-submersible platform (which installation may be used in an arrangement such as that shown in FIG. 3). Because the amount of fresh water produced is proportional to the number of columns that are present, the more columns that can be suspended from a single marine installation, the more productive the installation will be. Because the maximum diameter of an individual column is limited by the ability to efficiently cool and disperse the residual water formed during the process of hydrate formation, they must be located at distances suitable to allow for natural circulation of seawater. In addition, an embodiment having multiple columns can be established in such a way that the multiple columns share operational components such as the gas delivery, collection, and processing system as well as a fresh water collection system. Moreover, individual columns can be shut down or replaced without shutting down fresh water production of the entire system.

Flotation of the platform is provided by pontoons 1881, which support well above sea level a platform 1882 that carries accommodation and operation facilities 1883 and the gas processing and other apparatus necessary to the operation 1885. The columns 1890 are suspended from the bottom of a floating tank or vessel 1887, which constitutes the water collection section 1840 and which is at least partially flexible to allow it to accommodate varying sea conditions. Because fresh water in the water collection section 1887 is more buoyant than the seawater which displaces it, the section will float on the seawater and, when kept with enough fresh water in it to provide positive buoyancy, will not place a weight load on the structure of the semi-submersible platform to which it is affixed. In practice, its buoyancy will support most of the weight of the suspended columns 1890, which are held in position by rigging to a frame 1892 suspended from the semi-submersible platform 1880.

A gas delivery system, including pumps in the deck processing facility 1885 and gas lines 1893 leading to hydrate formation sections 1810 located near the bases of the columns, is affixed to the frame and can be individually attached and detached from the various individual columns 1890 when they are deployed and recovered. More than one "column" may supply gas hydrate, fresh water, and gas to the water collection section 1887. The lower buoyancy of the fresh and mixed water and hydrate in the upper part of the column will cause the water collection section to rise at least partly above the seawater surface.

The semi-submersible platform can be either moored by hard-line moorings 1895 or held in position by a commercially available dynamic positioning system (i.e., a computerized, Global Positioning System-controlled propulsion system) like those used by some ships (e.g., drill-ships and cable repair ships) to hold a fixed position. In one contemplated embodiment, the frame 1892 is stabilized in its position beneath the floating platform by computer controlled, commercially-available thrusters (not shown), which help hold the frame against current. A benefit arising from the water turbulence caused by the impellers will aid heat transfer from hydrate production and will benefit the process as a whole. Fresh water is pumped ashore via a flexible pipeline 1896, similar to those used for single-point buoyed moorings for deep-water petroleum field extraction. Gas lines, electrical connections, and communications systems are carried ashore via pipeline 1897, which follows the same pipeline course as pipeline 1896 for strength and general security of the pipeline system as a whole.

Where multiple columns are affixed to a communal fresh water and gas collector section 1840, continuous operation of the desalination operation is enabled by affixing the columns in such a way that any one can be shut down and removed or replaced without affecting the operation of the others. Thus, provision is made for the temporary capping of column "holders" with collars located in the base of the communal fresh water and gas collector section. The collars connect the columns to the water collection device in such a way that the columns can be detached and attached to the water collection section 1840 from below and outside without disrupting fresh water production in a multi-column installation, because caps over the collars can be put in place prior to detachment of the column.

Figure 6:
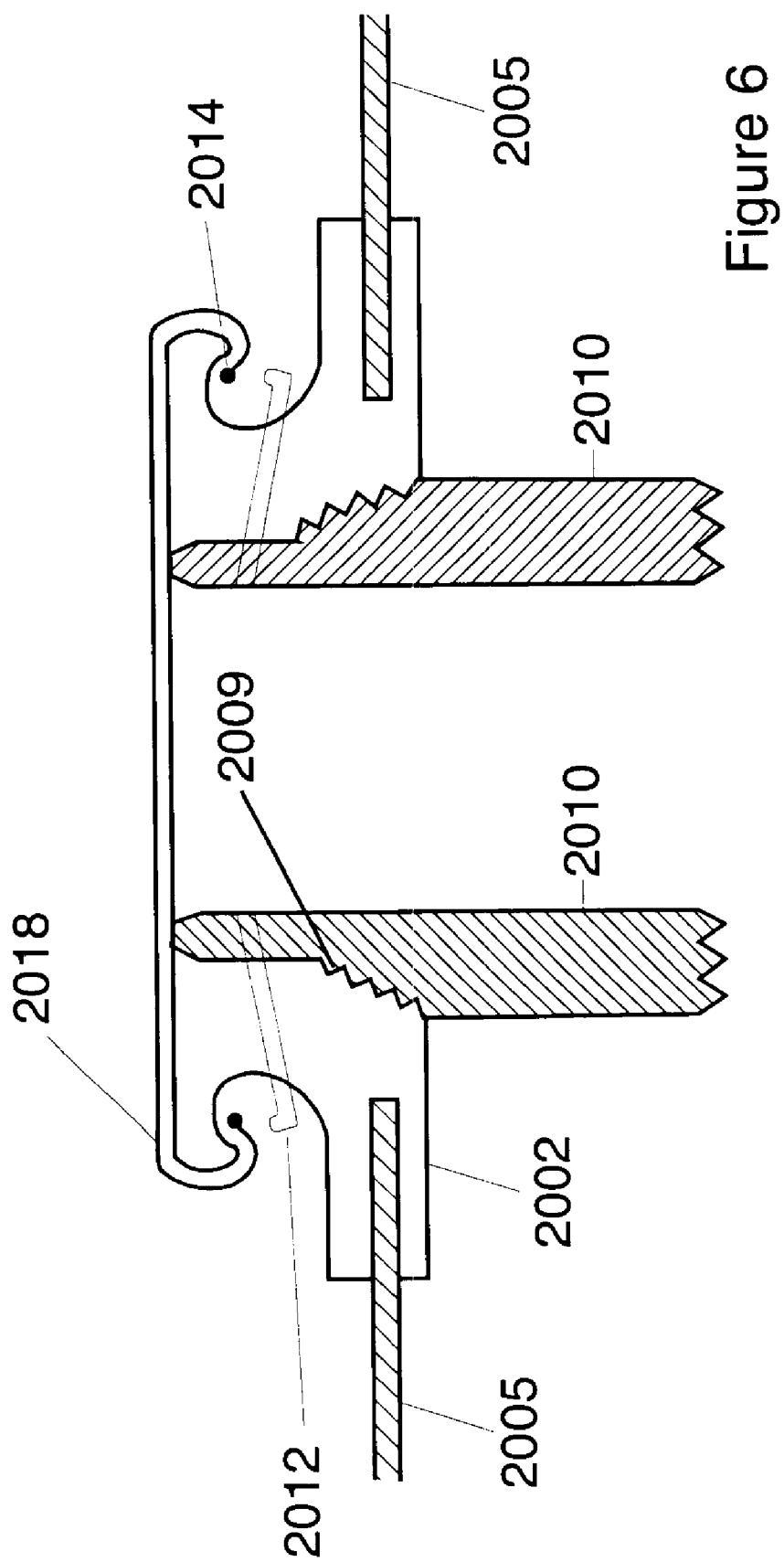
FIGS. 6 and 7 are diagrammatic, side elevation views of apparatus to enable detachment of the fractionation columns shown in FIG. 5.

FIG. 6 illustrates a rigid collar 2002, used to attach a fractionation column, which is permanently attached to the flexible material of the water collection section of the installation. The rigid collar 2002 can be permanently attached to the fabric by, for example, pressure fitting and glue and/or heat bonding, among other methods. In one configuration, tapered screw joints 2009, similar to the joints of drill-string pipe (which require only from approximately one-half to two turns to become fully engaged) hold the upper part of the fractionation column 2010, which is preferably rigid or semi-rigid. The lower column sections, which are made from relatively flexible material that can be clipped or fitted together, are suspended from the uppermost column fitment 2010. Security screws or pins 2012 prevent the column from moving and inadvertently opening.

Figure 7:
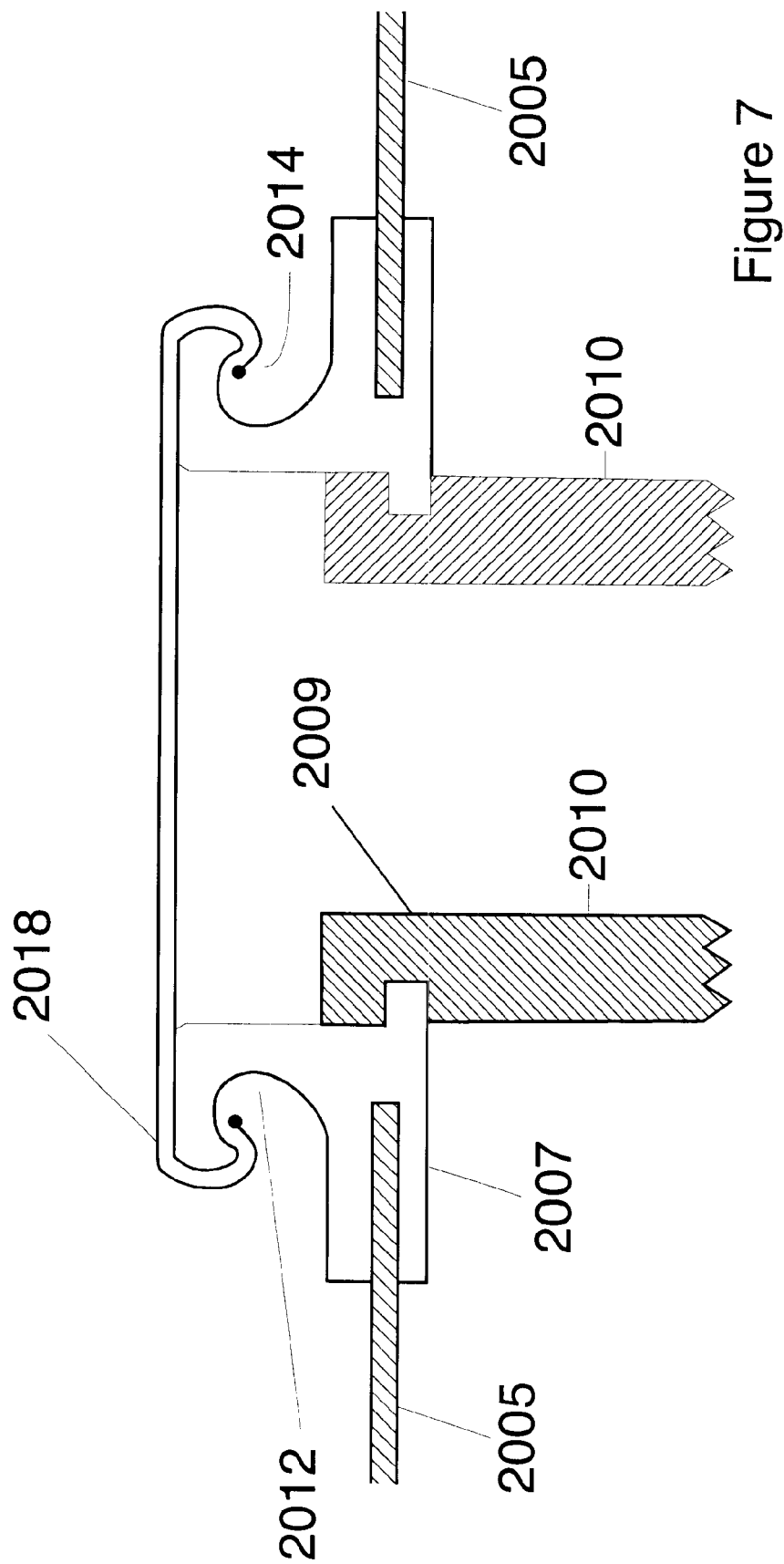

In another configuration, illustrated in FIG. 7, a bayonet-type fitting is used to securely hold the column 2010 in place. The bayonet-type fitting can be any suitable type of "insert-and-twist" overlapping joint where a flange on the inserted column 2013 "rides over" another flange 2011 on the collar. Preferably, the fitting is a quick-fit type fitting that is similar to a camera-lens fitting, i.e., one which requires approximately a quarter turn to close. Other modes of securing the various individual columns to the collars are possible, especially where the weight of the gas delivery system 1893 and the gas injector system in the hydrate formation region 1810 are supported by the submerged column support frame 1892, as illustrated in FIG. 5.

The collars have raised edges inside the water collection section 1840 so that "caps" can be placed over them and secured from inside the water collection section. This allows a given column to be removed from the water collection section 1840 without disrupting fresh water production from other columns.

There are a number of ways in which the columns can be capped. In one configuration, the caps are flexible and held with "draw-string"-type attachments 2014, as illustrated in FIGS. 6 and 7. Flexible covers 2018 have the advantage of easy fitment. Draw-string 2014 holds the outer edge of the cover below the lip of the collar. The draw-string can be placed loosely by a remotely operated vehicle and tightened to prevent the cap from being pushed down by the relative difference in the weight of water in the water collection section 1840 and the seawater that will flow up into the collar fitting region below the cap when the associated column is removed.

In other configurations, a flexible panel can be clipped into place and held with hinged bolts or pressure fittings, or other rapid attachment fitments, so that it presses down on a flexible "O" ring of the sort commonly used in watertight fittings. Although the pressure of the water in the water collection section will push down upon the cap and seal it, thereby ensuring that there is no mixing between the fresh water and the seawater, the mechanisms for holding the cap to the collar assembly will hold it in an already watertight position.

Hydrate fractionation apparatus as described above can be established in a variety of types of installations. For example, as illustrated, it can be constructed on a floating, semi-submersible platform similar to those used in the energy exploration and extraction industry (which utilize pontoons that ride below the wave base as their means of flotation). This provides for enhanced stability. Alternatively, such an installation can be constructed on a ship such as a large tanker, from which a column or columns can be rapidly deployable through a moon-pool in the ship's hull. In addition, fractionation columns can be deployed over the side or stern of a vessel or barge, which may have its own propulsion or be towed. As further illustrated above, installations can be fixed to the seafloor and either moored or buoyed to maintain an upright position. Where fixed to the seafloor, the apparatus can be entirely sub-surface, or its upper parts can broach the surface.

As yet another way in which to increase the efficiency of hydrate-based desalination, where geomorphic conditions permit it (e.g., such as on oceanic islands with steep sides and continental margins having steep slopes near shore), "hybrid" desalination installations may be established with the hydrate formation section located in the sea and the dissociation apparatus located on land. FIGS. 8–11 illustrate such an installation.

Figure 8:
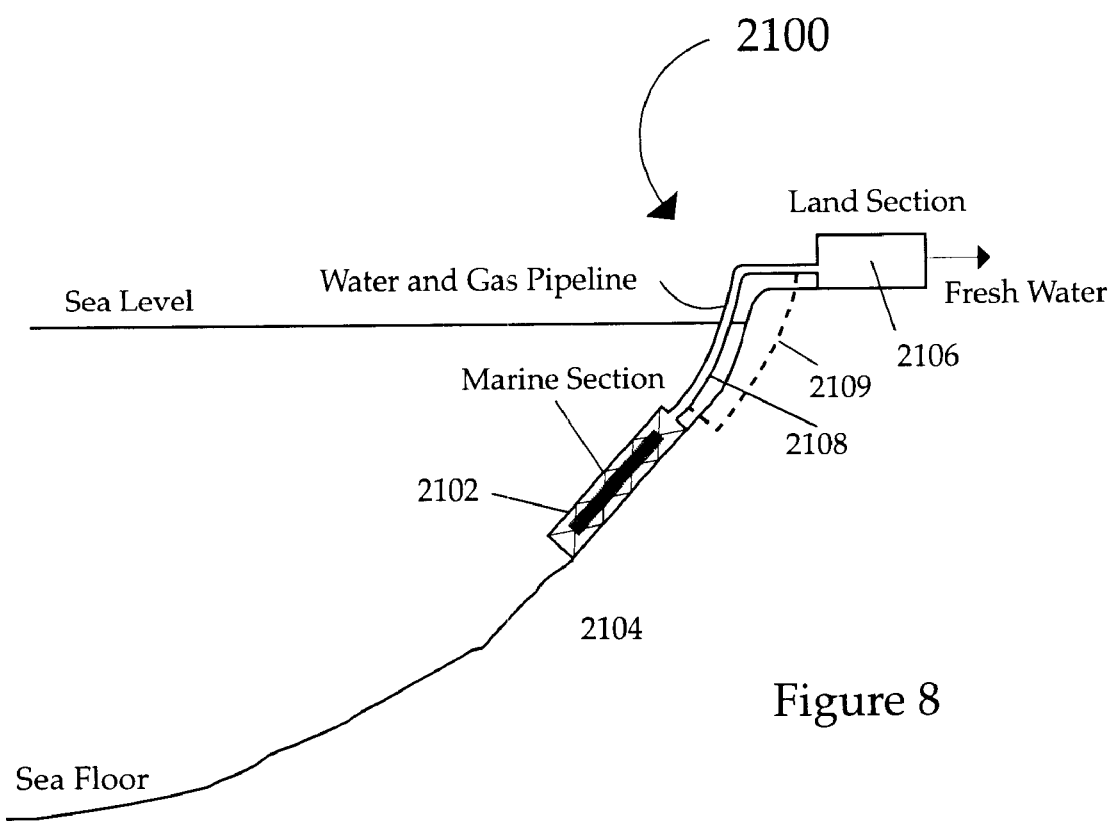
FIG. 8 is a diagrammatic, side elevation view of a hybrid desalination fractionation installation in accordance with another aspect of the invention.

In particular, as illustrated in FIG. 8, a hybrid hydrate fractionation apparatus 2100 includes two main or major sections, namely, a hydrate formation and cooling section 2102, which is established in the sea, and a hydrate dissociation section 2106, which is established on adjacent land. Fluid communication between the hydrate formation and cooling section 2102 and the hydrate dissociation section 2106 is (selectively) established by means of connector assembly 2108. The hydrate formation and cooling section 2102 is established at a suitable depth in the sea for spontaneous formation of hydrate for the particular hydrate-forming gas used, which is pumped down to the hydrate formation section via gas lines 2112 (illustrated in FIG. 9). In some instances, instead of being located completely above the surface of the seabed or slope along which it extends, it may be desirable (or even necessary) for the connector assembly 2108 to be constructed in a tunnel or drill hole extending at an angle through the seabed or slope, as illustrated by the dashed line 2109.

Figure 9:
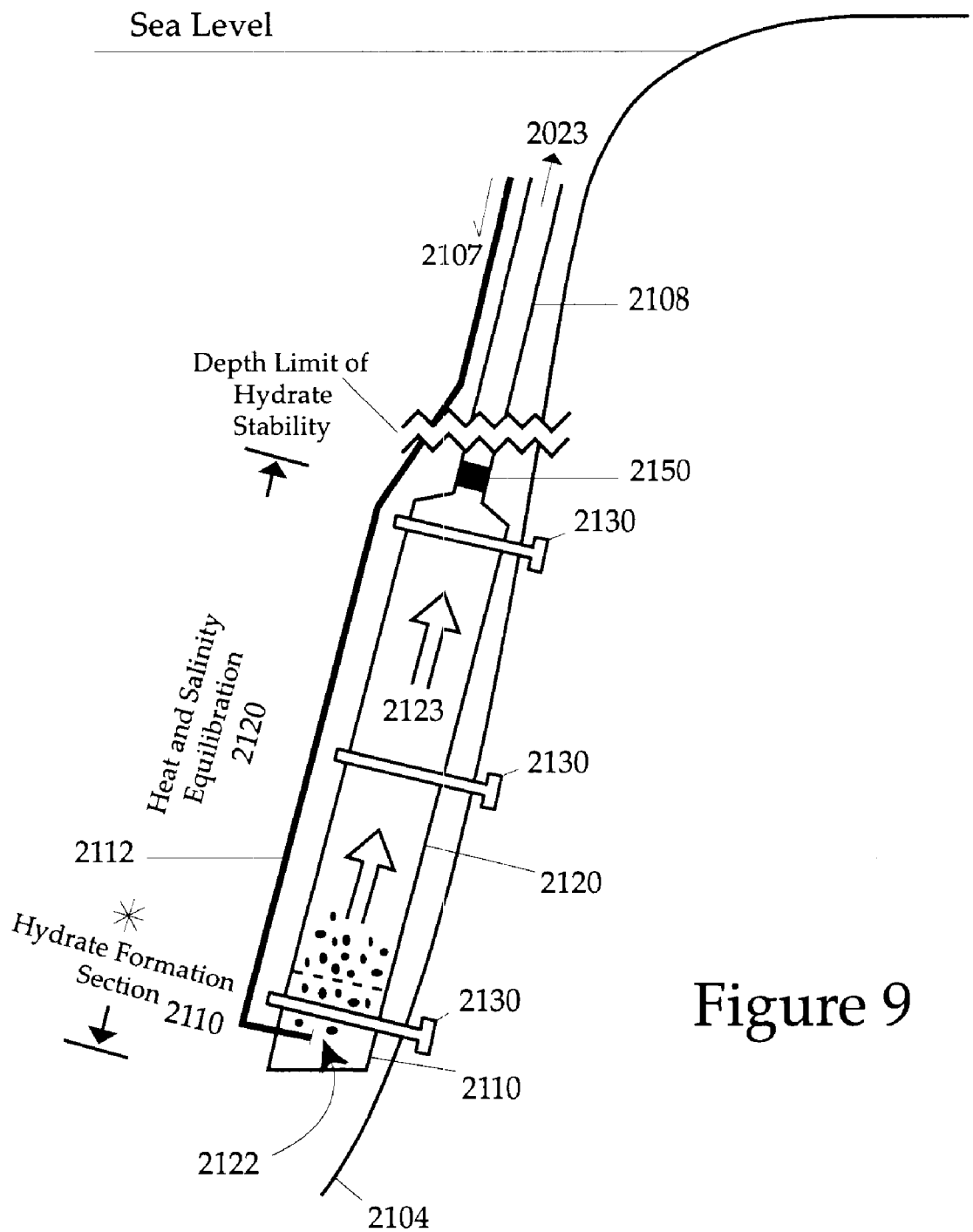
FIGS. 9 and 10 are diagrammatic, side elevation views illustrating the hydrate formation and heat equilibration and dispersal section of the installation shown in FIG. 8.

As illustrated in FIG. 9, the hydrate formation and cooling section 2102 of the installation is an open column in which hydrate 2122 is formed and travels upward. The hydrate formation and cooling section is located along any suitable slope—preferably along relatively steep slopes such as those immediately adjacent to land areas such as oceanic islands and some continental margins—and well below wave base. In particular, hybrid hydrate fractionation installations may be established in environments such as those found on the flanks of volcanic marine islands (e.g., the Hawaiian Islands, Guam, Ascension, Diego Garcia, etc.) and along various narrow continental margins (e.g., immediately offshore along parts of the Southern California coast).

The lowest portion or region of hydrate formation and cooling section 2102 constitutes the hydrate formation section 2110, as shown in FIG. 9. This section transitions upwardly into a heat and salinity equilibration portion or region 2120. The submarine part of the installation is open to the sea at its lower end and is in hydraulic equilibrium with the surrounding sea.

As illustrated in FIGS. 8 and 9, the column is fixed to the seafloor 2104. The column may be of a detachable or extendable nature, at least in its lower part, which can be deployed and recovered or replaced as desired. FIG. 8 illustrates a preferred embodiment, in which the hydrate formation and cooling section is mounted within an integral frame-and-column assembly 2120 that is supported by stanchions 2130 permanently affixed to the seafloor. While the frame and stanchions 2130 supporting the column preferably are structurally robust, the hydrate formation column itself only needs to be strong enough to maintain its shape and guide the hydrate upward. Therefore, the hydrate formation column can be fabricated from any suitable artificial fabric having helical guides to maintain the shape, thin fiberglass, semi-rigid plastic, or composite material. The frame and stanchions 2130 are also preferably formed largely from rust-resistant metals or composite materials.

Optimal performance should be obtained when the hydrate formation section is located as deep as possible below the hydrate-formation depth for any hydrate-forming gas intended to be used in order to facilitate the longest upward passage of hydrate (limited, perhaps, by the increasing cost of construction with increasing water depth). A preferred embodiment is a simple, fixed-depth column. Alternatively, at least the lower part of the apparatus may be extendable in a slip-frame such that the hydrate-formation section 2110 can be moved longitudinally, whereby the depth of hydrate-formation can be varied to accommodate changing oceanographic conditions or to accommodate the use of different hydrate-forming gas or gas mixtures.

Hydrate forming gas 2107 is pumped via gas line 2112 and injected near the base of the apparatus to cause positively buoyant gas hydrate 2122 to form and rise naturally, as indicated by arrows 2123. More than one gaseous or liquid hydrate-forming substance may be injected, and the particular gas or liquid mixture will affect the depth of the hydrate formation region. Where some of the hydrate-forming gas or liquid is not completely used in the formation of hydrate, trapped gas or buoyant liquid can render a "bubble" of negatively buoyant hydrate and residual hydrate-forming substance positively buoyant, or it can render even more buoyant hydrate which is already positively buoyant. (Thus, "positively buoyant hydrate" refers to pure hydrate that is, per se, positively buoyant as well as a conglomerate of hydrate and residual hydrate-forming substance which, in toto, is positively buoyant.)

Hydrate formed in the underwater hydrate formation column is conveyed to the land-based hydrate-dissociation and water/gas separation section 2106 via connector assembly 2108. The connector assembly 2108, which can be constructed from any suitable structure such as a pipe, allows the hydrate to rise through it due to the hydrate's positive buoyancy (assuming a positively buoyant hydrate-forming substance is used). In the embodiment illustrated in FIGS. 8–10, the connector assembly 2108 (which may be insulated above the level at which the pressure in the assembly is low enough for the hydrate to begin to dissociate) is supported in a frame (not shown) mounted on the seafloor; it may be buried in a trench; or it may be constructed through a protected seafloor tunnel (as illustrated by dashed lines in FIG. 7) in order to protect the connector assembly 2108 from surge and wave forces. The lower end of the connector assembly 2108 preferably lies within the stability field for the particular hydrate being used.

The submarine part of a hybrid hydrate-based desalination installation may include multiple hydrate formation and cooling sections 2102 (not shown), each supplying hydrate to the surface part of the installation. Hydrate produced in each section 2102 may be collected in a single, common heat and salinity equilibration section. Alternatively, multiple heat and salinity equilibration sections may converge together and pass hydrate upward into a single connector assembly 2108.

Figure 10:
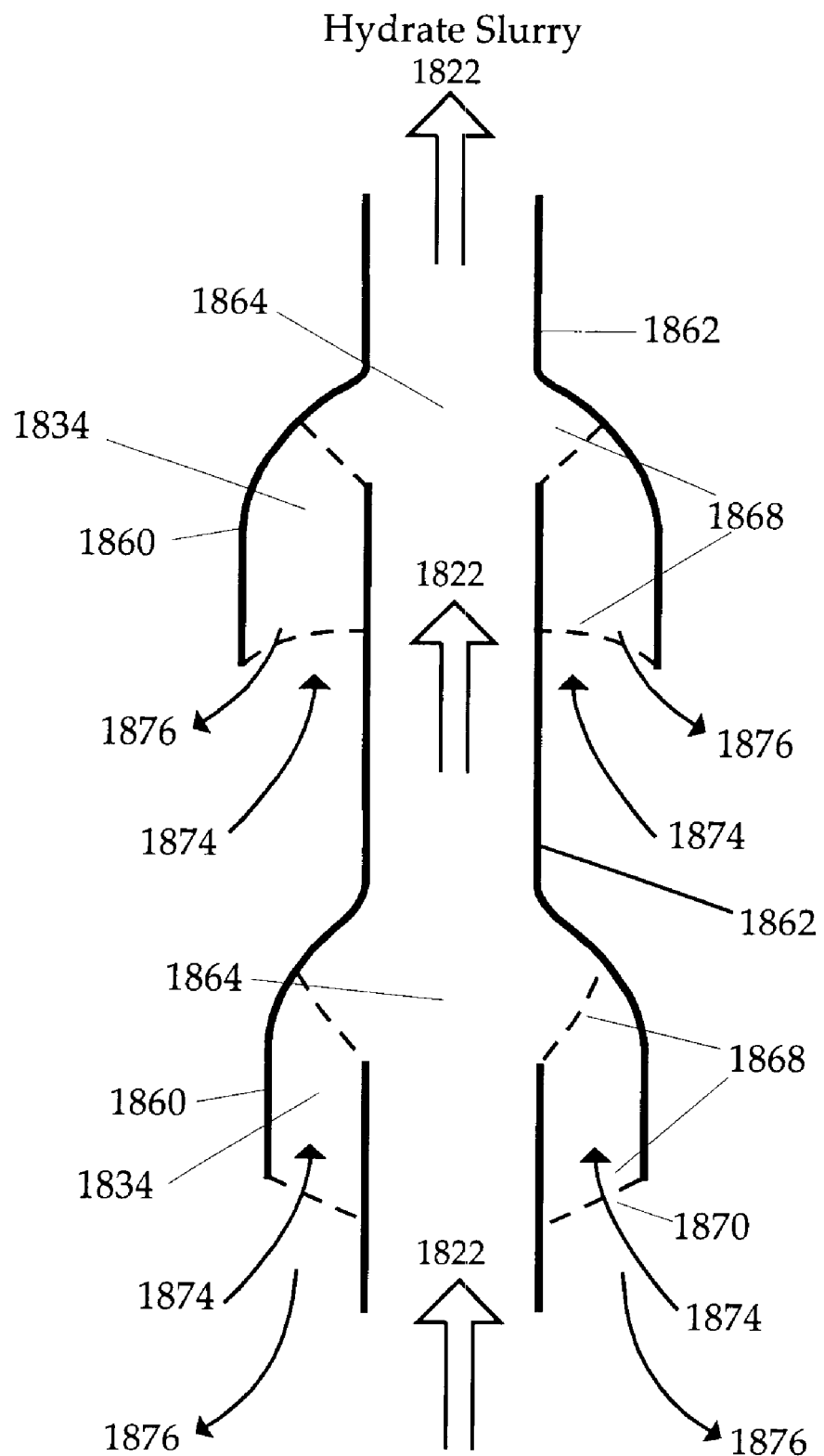
Figure 11:
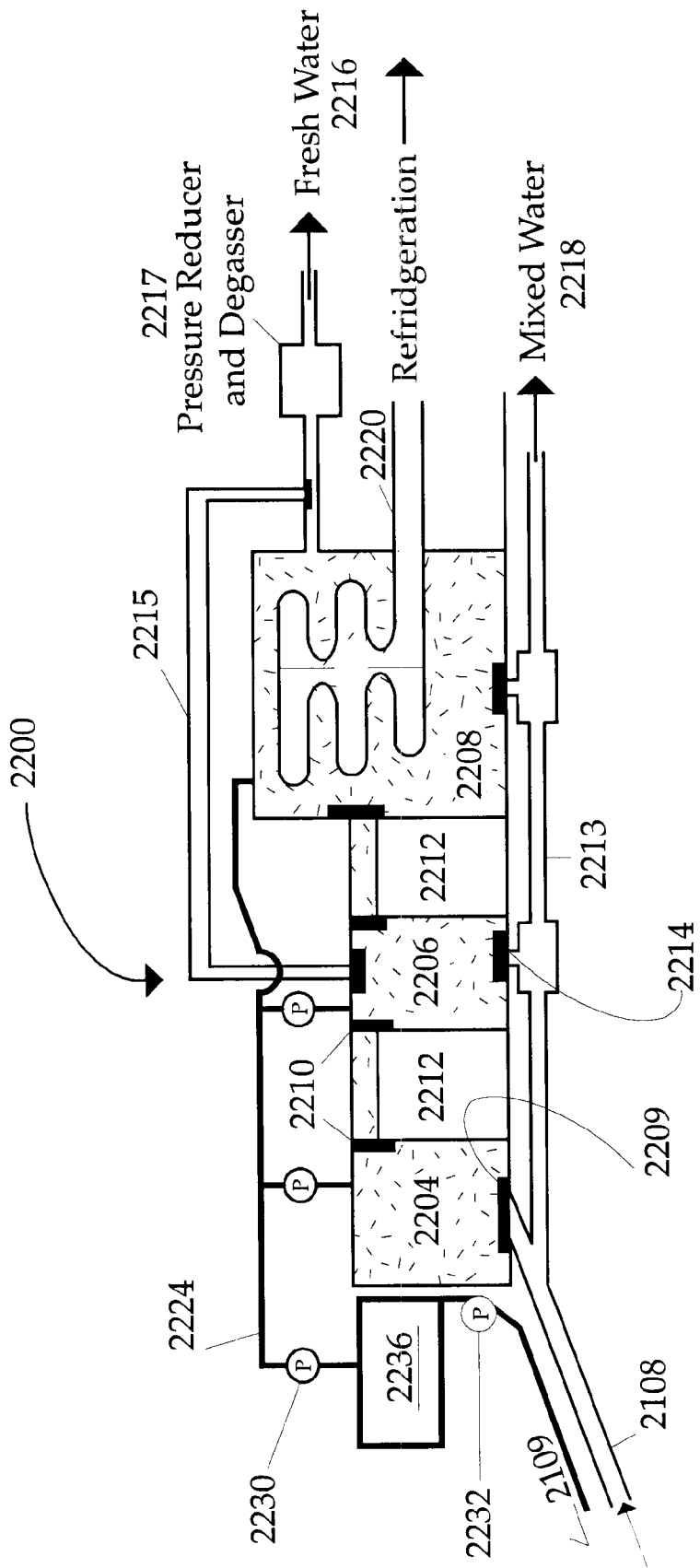
FIG. 11 is a diagrammatic, side elevation view of the land-based, hydrate dissociation portion of the hybrid installation shown in FIG. 8.

One possible configuration of the thermal equilibration and dispersal section 2120 (FIG. 9), is composed of jointed, overlapping sections of column segments that each have a lower, "hood" portion 1860 and an upper, riser portion 1862, is illustrated in FIG. 10. The hood sections 1860 have a greater diameter than the riser sections 1862 and overlap the riser sections 1862 of the column segments, as illustrated. A gap area 1864 is located between each riser portion 1862 and the overlapping hood portion 1860, which allows residual water (brine) within the column to be exchanged with the water from outside the column. Thus, hydrate 1822 rises buoyantly and unimpeded up the apparatus while residual water 1876 cools and disperses from the apparatus through vents 1834 created by the overlapping arrangement of portions 1860 and 1862.

Seawater 1874, having ambient temperature and salinity, enters the column through vents 1834 and substantially replaces residual water within the column. In particular, residual saline water remaining after hydrate has been formed exothermically, which will have been warmed by that exothermic formation, will be cooled by conduction and heat exchange with ambient seawater 1874 from which no hydrate has been formed. Additionally, the configuration facilitates the exchange of ambient seawater 1874 and residual water within the column because the cooled, more saline water 1876 is more dense and flows downward, away from the rising hydrate stream.

In operation, positively buoyant hydrate 1822 rises through and passes from one overlapping segment of the thermal equilibration section 1862 to the next. Where the inclination of the column as a whole is less than that which would otherwise allow the hydrate to pass easily or unimpeded from one section to the next, the transition zone between segments 1864, where the hydrate is not immediately constrained laterally by a pipe section between overlapping joints, is kept near vertical while the upper part of each section may be inclined. Thus, overall, the column will lie essentially parallel to the generally steep seafloor slope, whereas the heat and salinity equilibrium section 2120 (FIG. 9) may be in part more vertical, at least in the hooded overlap areas between the segments (FIG. 10).

As noted above, hydrate forms exothermically, i.e., giving off heat of formation. That heat substantially dissipates in the equilibration section 2120 of the installation. Subsequently, when the hydrate rises above the pressure depth at which it remains stable, it will dissociate ("melt") endothermically, drawing heat (heat of dissociation) from its surroundings in the process. The amount of heat of dissociation the hydrate absorbs as it dissociates is approximately the same as the amount given off when it forms. Because the heat of formation dissipates from the installation by exchange of the heated residual water (brine) with cooler surrounding ambient water in the thermal equilibration section of the installation, that heat is no longer available for the hydrate to consume during dissociation. Therefore, because the hydrate will, in fact, dissociate above its stability pressure depth, and it will, in fact, draw in heat as it does so, there is significant cooling potential associated with the hydrate and its dissociation.

In order to optimize the cooling potential provided by the dissociation reaction, it is preferable to configure and control operation of the installation such that dissociation takes place in as restricted a volume as possible. To that end, a maximum amount of hydrate that has been formed and cooled in the hydrate formation and cooling section 2102 (FIGS. 1, 2) preferably is delivered to the land section 2106 of this invention.

Preferably, the land installation 2106 is entirely pressurized. (Constructing it at least partially embedded within the ground to reinforce it and better enable it to withstand the pressurization is contemplated.) The embodiment of such a land installation illustrated in FIG. 11 allows the hydrate to rise into a series of separate vessels in which the pressure caused by dissociation of the hydrate (attributable to the release of gaseous hydrate-forming substance from the hydrate) entirely or almost entirely pressurizes the apparatus. Thus, once the apparatus as a whole has been charged by the increase in pressure caused by initial hydrate dissociation (and by supplemental pumping, if necessary), virtually all of the incoming hydrate is delivered to a relatively compact heat exchanger vessel 2208 in which virtually all of the rest of hydrate dissociation occurs.

The land installation 2106 is configured such that hydrate is concentrated before it is moved from one pressure vessel to the next. Thus, the system operates in a batch mode rather than continuously, with each batch cycle including concentrating the hydrate in a holding vessel 2204; washing the hydrate and replacing saline interstitial fluids with fresher water in washing vessel 2206; and allowing the hydrate to dissociate (with attendant heat absorption) in vessel (or multiple vessels) 2208. Because the apparatus is divided into a number of vessels, concentration, washing, and dissociation of the hydrate can be ongoing processes, with separate batches of hydrate being subjected to each of the steps all at the same time. Additionally, more than one of each type of vessel can be provided in a given land installation to increase throughput. In particular, multiple dissociation and heat exchange vessels may be fed from a single concentration and washing section, since the process steps in those sections may be completed more quickly than the dissociation and heat exchange step.

Once the land apparatus of the overall installation has been filled with water by low-pressure pumping, its internal pressure can be raised and maintained using the dissociation reaction of the hydrate to is achieve most of the requisite pressurization (rather than using energy-consuming pumping to do so, which can be used as needed to "top off" the system pressure). Because hydrate compresses gas molecules into the crystal lattice when it forms at depth in the sea, elevated pressures are produced when the hydrate dissociates and releases those gas molecules under lower confining pressures. For example, when the hydrate of pure methane dissociates, it produces over-pressures equivalent to the pressures encountered at about 1.6 km water depth. About 160 cubic meters of gas is contained within one cubic meter of gas hydrate. Where dissociation is restricted to pressures above normal atmospheric pressure (e.g., four or five times atmospheric pressure), the produced gas occupies proportionally smaller volumes. Pressures within the land apparatus are managed (e.g., by controlling the venting) so as to cause a natural flow of hydrate and interstitial water, from the input into the apparatus 2204 to the dissociation vessel 2208 and then to output from the apparatus, i.e., from higher pressure regions of the apparatus to lower pressure regions of the apparatus. It may also be necessary to better control the flow of hydrate and water between the different vessels of the surface installation by pumping.

The demand for heat which arises when dissociation occurs can be used to provide considerable refrigeration. In a closed volume, continuous hydrate dissociation will, over time, lower the temperature of the entire vessel in which the dissociation is taking place and, eventually, may even cause water ice to form. Therefore, a heat exchange system assembly 2220 delivers heat required for the hydrate dissociation to continue and keeps the temperature of the dissociation vessel at a desired temperature above the freezing point of water, while at the same time heat is absorbed from the heat exchanger system by the dissociating hydrate. This cools the fluid circulating within the heat exchanger system so that it can be used as the operating fluid in a nearby refrigeration system. Thus, the land apparatus 2106 functions as a heat sink while hydrate is dissociating. Moreover, because heat of formation of the hydrate has been dissipated into the ocean in the underwater thermal equilibration portion of the installation with residual brines, the heat sink potential of the hydrate—and hence the overall refrigeration capacity of the hybrid installation—is maximized.

Figure 12:
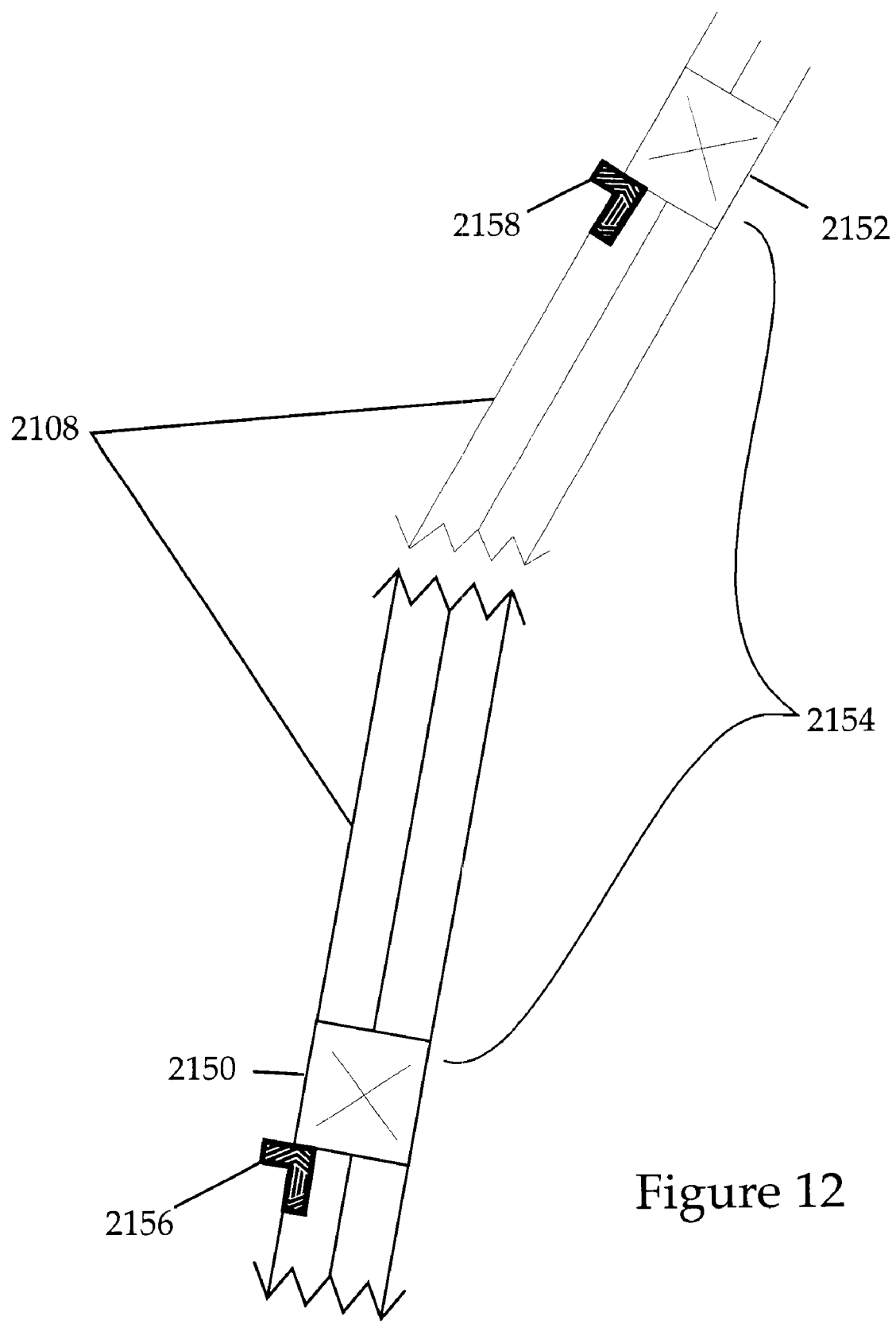
FIG. 12 is a diagrammatic, side elevation view of the connector section of the hybrid installation shown in FIG. 9.

In order for the land or surface installation to remain pressurized, provision must be made for isolating the pressures of the upper part of the connector assembly 2108 and the pressurized land installation as a whole. Otherwise, the hydrate and fluid within the pressurized system and the connector assembly would be blown back down the connector assembly and into the sea. Therefore, a lower constrictor 2150, illustrated in FIGS. 9 and 12, is positioned in the connector assembly 2108, below the upper limit of hydrate stability. The constrictor 2150 can be closed to restrict the upward passage of hydrate from below it as well as to help prevent "blow-back" of hydrate. Additionally, by holding the hydrate at depths where it is stable, a "slug" of very hydrate-rich slurry can be released when the constrictor is opened.

A second, upper controllable constrictor 2152 is also provided in the connector assembly. If both controllable constrictors 2150, 2152 are located below depths where hydrate is stable, assuming the connector section 2108 is strengthened sufficiently, the hydrate will not only to rise in concentrated slugs, but the concentrated hydrate and interstitial seawater fluid can be isolated from the apparatus below it. By constructing the connector assembly from relatively large-diameter pipes or pipes that are sufficiently long, quite large volumes of hydrate ("slugs") will be concentrated within the assembly.

Controllable gas vents 2156 and 2158, located below the lower constrictor 2150 and the upper constrictor 2152, respectively, allow gas that may have exsolved (due to the reduction in pressure of interstitial water or due to over-saturation caused when water was extracted from the salt-water by hydrate formation) to be released. (Such exsolved gases are not hydrate-forming gases; rather, they are gases such as oxygen, nitrogen, carbon dioxide, and others that commonly are dissolved in seawater and which come out of solution when the water in which they are dissolved is raised to a shallower depth, where the lower water pressures cause the relative gas partial pressures to rise and the gas to exsolve if supersaturation is exceeded.) Removing non-hydrate forming gas at depth reduces dilution of the recovered hydrate-forming gas by the normally dissolved seawater gases.

In operation, the upper constrictor 2152 is closed, and hydrate rising from below concentrates below the constrictor. When the section 2154 between the constrictors is filled with hydrate that has been concentrated by its buoyancy, the lower constrictor 2156 is closed and the upper constrictor 2152 is opened. Pressure in the section between the constrictors rises because this section 2154 is now in hydraulic equilibrium with the fluid in the connector assembly above, which includes the pressure caused by the weight of water in the assembly and the artificial pressure that is maintained to keep the hydrate from dissociating until it has risen into the dissociation apparatus on land. Where there is no obstruction, the formation, delivery, and dissociation of hydrate is a relatively continuous process controlled by the introduction of hydrate forming gas. In this pressurized installation, however, the delivery of the hydrate is intermittent, which results in batches of hydrate arriving in the surface apparatus for dissociation.

It should be appreciated that the embodiments disclosed and described herein are illustrative and that other embodiments will occur to those having skill in the art. Such modifications to and departures from the disclosed embodiments, while embodying the spirit of the various aspects of the invention disclosed herein, are deemed to fall within the scope of the following claims.

What is claimed is:

1. A method of desalinating or otherwise purifying water to be treated in a hydrate-based, desalination or purification installation located in a naturally occurring body of water, said installation extending downward and having a lower, hydrate formation region disposed at a hydrate formation region depth, said method comprising:

drawing water to be treated from a depth other than the hydrate formation region depth, the temperature of ambient water at the depth from which the water to be treated is drawn being lower than the temperature of ambient water at the hydrate formation region depth;

conveying and delivering the water to be treated to a hydrate formation region of said installation and introducing a gas hydrate-forming substance into said water to be treated in said hydrate formation region, the temperature of said water to be treated and the pressure within said hydrate formation region being conducive to formation of hydrate of said gas hydrate-forming substance, said gas hydrate-forming substance being introduced in a manner such that said hydrate is, at least in toto, positively buoyant;

allowing said hydrate to rise into an upper region of the installation and dissociate into said gas hydrate-forming substance and fresh or purified water; and collecting said fresh or purified water.

2. The method of claim 1, wherein the depth from which said water to be treated is drawn is less than said hydrate formation region depth.

3. The method of claim 1, wherein said water to be treated is degassed before being delivered to the hydrate formation region of said installation by being conveyed upward to a depth that is less than the depth from which it was drawn, whereby gas dissolved in said water to be treated is exsolved from said water to be treated.

4. The method of claim 3, wherein said water to be treated is degassed by being conveyed upward toward the surface of the body of water and then is conveyed downward before being delivered to said hydrate formation region.

5. The method of claim 4, further comprising pre-treating said water to be treated before it is delivered to the hydrate formation region of said installation by introducing an initial amount of pre-treatment gas hydrate-forming substance into said water to be treated.

6. The method of claim 3, further comprising pre-treating said water to be treated before it is delivered to the hydrate formation region of said installation by introducing an initial amount of pre-treatment gas hydrate-forming substance into said water to be treated.

7. The method of claim 1, further comprising pre-treating said water to be treated before it is delivered to the hydrate formation region of said installation by introducing an initial amount of pre-treatment gas hydrate-forming substance into said water to be treated.

8. The method of claim 1, further comprising varying the depth from which said water to be treated is drawn as the temperature of ambient water at the depth from which said water to be treated is drawn varies.

9. The method of claim 1, further comprising capturing and recycling said gas hydrate-forming substance in a further cycle of hydrate-based desalination or water purification.

10. The method of claim 1, further comprising cooling said water to be treated before delivering said water to be treated to the hydrate formation region of the installation.

11. A method of desalinating or otherwise purifying water to be treated in a hydrate-based, desalination or purification installation, said installation being located in a naturally occurring body of water, said method comprising:

drawing water to be treated and degassing said water to be treated by conveying said water to be treated upward to a depth that is less than the depth from which said water to be treated was drawn such that gas dissolved in said water to be treated is exsolved from said water to be treated;

conveying and delivering said water to be treated to a hydrate formation region of said installation and introducing a gas hydrate-forming substance into said water to be treated in said hydrate formation region under pressure and temperature conditions conducive to formation of hydrate of said gas hydrate-forming substance, said gas hydrate-forming substance being introduced in a manner such that said hydrate is, at least in toto, positively buoyant;

allowing said hydrate to rise into an upper region of said installation and dissociate into said gas hydrate-forming substance and fresh or purified water; and collecting said fresh or purified water.

12. The method of claim 11, wherein said water to be treated is degassed by being conveyed upward toward the surface of the body of water and then is conveyed downward and delivered to said hydrate formation region.

13. The method of claim 12, further comprising pre-treating said water to be treated before it is delivered to the hydrate formation region of said installation by introducing an initial amount of pre-treatment gas hydrate-forming substance into said water to be treated.

14. The method of claim 12, further comprising cooling said water to be treated before delivering said water to be treated to the hydrate formation region of said installation.

15. Apparatus for desalinating or otherwise purifying water to be treated using a gas hydrate-forming substance, said apparatus comprising:

a fractionation column located within a naturally occurring body of water, said fractionation column having
    1) a lower, hydrate formation region disposed at a hydrate formation region depth, where pressure is conducive to formation of hydrate of the gas hydrate-forming substance, and
    2) an upper, hydrate dissociation region;

a water intake system extending to and configured to draw water to be treated from a depth other than said hydrate formation region depth, the temperature of ambient water at the depth from which the water to be treated is drawn being lower than the temperature of ambient water at the hydrate formation region depth, said water intake system being configured to convey and introduce the water to be treated into the hydrate formation region of said fractionation column; and a gas hydrate-forming substance introduction system configured and disposed to introduce the gas hydrate-forming substance into the water to be treated in said hydrate formation region.

16. The apparatus of claim 15, wherein said water intake system draws the water to be treated from a depth that is less than said hydrate formation region depth.

17. The apparatus of claim 15, wherein said water intake system extends upward, from the depth at which the water to be treated is drawn toward the surface of the body water, then downward to said hydrate formation region.

18. The apparatus of claim 15, further comprising a pre-treatment system configured to introduce an initial amount of pre-treatment gas hydrate-forming substance into the water to be treated before the water to be treated is introduced into said hydrate formation region.

19. The apparatus of claim 15, wherein said water intake system is configured such that the depth from which said water intake system draws the water to be treated can be varied.

20. The apparatus of claim 19, wherein said water intake system comprises a duct having multiple, selectively openable orifices disposed at different water depths along the length of said duct.

21. Apparatus for desalinating or otherwise purifying water to be treated using a gas hydrate-forming substance, said apparatus comprising:
  a fractionation column located within a naturally occurring body of water, said fractionation column having
    1) a lower, hydrate formation region disposed at a hydrate formation region depth, where pressure is conducive to formation of hydrate of the gas hydrate-forming substance, and
    2) an upper, hydrate dissociation region;
  a water intake system configured to draw in water to be treated, convey the water to be treated upward, and subsequently introduce the water to be treated into the hydrate formation region of said fractionation column, said water intake system having a gas release by means of which gas is exsolved from the water to be treated is released from said water intake system; and
  a gas hydrate-forming substance introduction system configured and disposed to introduce the gas hydrate-forming substance into the water to be treated in said hydrate formation region.

22. The apparatus of claim 21, wherein said water intake system extends upward, from the depth at which the water to be treated is drawn toward the surface of the body water, then downward to said hydrate formation region.

23. The apparatus of claim 21, further comprising a pre-treatment system configured to introduce an initial amount of pre-treatment gas hydrate-forming substance into the water to be treated before the water to be treated is introduced into said hydrate formation region.

24. A method of desalinating or otherwise purifying water to be treated in a hydrate-based, desalination or purification installation using a gas hydrate-forming substance, said method comprising:
  introducing water to be treated into a hydrate formation region of said installation, water pressure and temperature in said hydrate formation region being conducive to formation of hydrate of said gas hydrate-forming substance;
  obtaining said gas hydrate-forming substance from a pre-pressurized source and introducing said gas hydrate-forming substance into said water to be treated in said hydrate formation region in a manner which causes hydrate of said gas hydrate-forming substance to form which is, at least in toto, positively buoyant;
  allowing said hydrate to rise into an upper region of the installation and dissociate into said gas hydrate-forming substance and fresh or purified water;
  collecting said fresh or purified water released upon dissociation of said hydrate; and
  passing said gas hydrate-forming substance to a downstream application without reusing said gas hydrate-forming substance in another cycle of desalination or purification.

25. The method of claim 24, wherein said gas hydrate-forming substance is methane and said obtaining comprises obtaining said methane from an underwater deposit of methane.

26. The method of claim 24, wherein said gas hydrate-forming substance is natural gas;
  said natural gas is obtained and introduced into said hydrate formation region in liquified form;
  said hydrate dissociates into pure water and gaseous natural gas; and
  said natural gas is passed to said downstream application in gaseous form.

27. The method of claim 26, wherein said installation is located in a naturally occurring body of water and said liquified natural gas is delivered to said installation by boat.

28. The method of claim 27, wherein said gaseous natural gas is passed ashore.

29. A method of vaporizing natural gas originally in liquified form, said method comprising:
  injecting said liquified natural gas into a body of water under temperature and pressure conditions conducive to formation of natural gas hydrate;
  allowing said natural gas hydrate to rise and dissociate into water and gaseous natural gas; and
  passing said gaseous natural gas to a downstream application without reusing said natural gas in another cycle of hydrate formation and dissociation.

30. The method of claim 29, wherein said body of water is a body of saltwater or otherwise polluted water;
  said hydrate dissociates into said gaseous natural gas and fresh or purified water; and
  said fresh or purified water is collected for downstream use.

31. Apparatus for desalinating or otherwise purifying water to be treated using a gas hydrate-forming substance, said apparatus comprising:
  a plurality of fractionation columns each having
    1) a lower, hydrate formation region disposed at a depth where pressure is conducive to formation of hydrate of the gas hydrate-forming substance, and
    2) an upper, hydrate dissociation region;
  a gas hydrate-forming substance introduction system configured and disposed to introduce the gas hydrate-forming substance into water to be treated disposed within the hydrate formation regions of said fractionation columns; and
  a common water collection section from which each of said plurality of fractionation columns depends, said water collection section communicating with the upper, hydrate dissociation regions of said plurality of fractionation columns;

whereby gas hydrate formed in the hydrate formation regions said fractionation columns rises into said upper, hydrate dissociation regions of said columns and releases fresh or purified water and the gas hydrate-forming substance, and whereby the released fresh or purified water from each of said plurality of fractionation columns is collected in said common water collection section.

32. The apparatus of claim 31, wherein said apparatus is disposed in a naturally occurring body of water; and wherein said fractionation columns are open to said body of water such that water flows naturally into the hydrate formation regions thereof.

33. The apparatus of claim 32, wherein said fractionation columns and said common water collection section are cooperatively configured such that at least some of said plurality of fractionation columns can be removed from said common water collection section and said apparatus can be operated to desalinate or purify water with said at least some of said plurality of fractionation columns removed.

34. A hybrid installation for desalinating or otherwise purifying water to be treated using a gas hydrate-forming substance, said apparatus comprising:

a hydrate formation installation disposed within a naturally occurring body of water, generally near an above-water landmass, said hydrate formation installation having a hydrate formation region configured to receive water from said naturally occurring body of water and disposed at a depth where pressure and temperature conditions are conducive to formation of hydrate of the gas hydrate-forming substance;

a hydrate dissociation and water collection installation disposed above water on said above-water landmass; and a connector assembly establishing communication between said hydrate formation installation and said hydrate dissociation and water collection installation;

whereby gas hydrate is formed in said hydrate formation installation upon introducing the gas hydrate-forming substance into said hydrate formation region;

said gas hydrate rises through said connector assembly into said hydrate dissociation and water collection installation; and said gas hydrate dissociates into fresh or purified water and the gas hydrate-forming substance in said hydrate dissociation and water collection installation.

35. The installation of claim 34, wherein said hydrate formation installation includes a salinity and thermal equilibration section in which heated residual water is replaced by ambient water from the naturally occurring body of water.

36. The installation of claim 34, wherein said connector assembly has at least one flow constrictor by means of which flow through said connector assembly can be interrupted.

37. The installation of claim 36, wherein said connector assembly has two flow constrictors such that a slug of hydrate-rich slurry can be formed therebetween for batch-mode introduction into said hydrate dissociation and water collection installation.

38. The installation of claim 34, wherein said hydrate dissociation and water collection installation comprises at least one pressurized vessel in which the gas hydrate dissociates under pressure-controlled conditions.

* * * * *